US010863530B2

(12) United States Patent
Lim et al.

(10) Patent No.: US 10,863,530 B2
(45) Date of Patent: Dec. 8, 2020

(54) METHOD AND APPARATUS FOR ADJUSTING TIMING IN WIRELESS COMMUNICATION SYSTEM

(71) Applicant: Samsung Electronics Co., Ltd., Suwon-si (KR)

(72) Inventors: Jongbu Lim, Seoul (KR); Hyunil Yoo, Suwon-si (KR); Yeohun Yun, Hwaseong-si (KR); Chanhong Kim, Suwon-si (KR); Taeyoung Kim, Seoul (KR); Jiyun Seol, Seongnam-si (KR); Sungnam Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/934,168

(22) Filed: Mar. 23, 2018

(65) Prior Publication Data
US 2018/0279334 A1    Sep. 27, 2018

(30) Foreign Application Priority Data

Mar. 23, 2017   (KR) .................. 10-2017-0037148

(51) Int. Cl.
| | | |
|---|---|---|
| *H04W 72/12* | (2009.01) | |
| *H04W 72/08* | (2009.01) | |
| *H04L 27/26* | (2006.01) | |
| *H04L 1/00* | (2006.01) | |
| *H04L 5/14* | (2006.01) | |

(Continued)

(52) U.S. Cl.
CPC ....... *H04W 72/1226* (2013.01); *H04L 1/0004* (2013.01); *H04L 5/0091* (2013.01); *H04L 5/1469* (2013.01); *H04L 27/2607* (2013.01); *H04L 27/2646* (2013.01); *H04L 27/2691* (2013.01); *H04W 56/0045* (2013.01); *H04W 72/082* (2013.01); *H04L 5/0023* (2013.01); *H04L 5/0035* (2013.01); *H04L 5/0085* (2013.01); *H04W 72/042* (2013.01); *H04W 76/27* (2018.02)

(58) Field of Classification Search
CPC . H04W 72/0446; H04W 84/12; H04W 84/18; H04W 28/04; H04W 28/06
USPC ........................................................ 370/336
See application file for complete search history.

(56) References Cited

U.S. PATENT DOCUMENTS

| | | | |
|---|---|---|---|
| 2006/0239367 A1* | 10/2006 | Wilhelmsson | .... H04L 25/03006 375/260 |
| 2012/0106517 A1* | 5/2012 | Charbit | ................. H04W 72/04 370/336 |

(Continued)

*Primary Examiner* — Peter G Solinsky
*Assistant Examiner* — Sanjay K Dewan

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). An embodiment of the present disclosure relates to a method for operating a terminal, which includes receiving timing advance (TA) information related to an interference, determining whether to apply the TA information related to the interference, and transmitting uplink data based on the TA information related to the interference, and the terminal performing the same. Further, the present disclosure relates to a method and an apparatus for operating a base station operating with the terminal.

20 Claims, 30 Drawing Sheets

(51) Int. Cl.
   H04L 5/00     (2006.01)
   H04W 56/00    (2009.01)
   H04W 76/27        (2018.01)
   H04W 72/04        (2009.01)

(56) References Cited

U.S. PATENT DOCUMENTS

| | | | |
|---|---|---|---|
| 2012/0127964 A1* | 5/2012 | Turtinen | H04W 56/0045 370/336 |
| 2013/0242812 A1 | 9/2013 | Khoryaev et al. | |
| 2013/0279484 A1* | 10/2013 | Duenyas | H04W 72/082 370/336 |
| 2014/0029586 A1* | 1/2014 | Loehr | H04W 56/0005 370/336 |
| 2014/0036889 A1* | 2/2014 | Kim | H04L 1/1854 370/336 |
| 2014/0133474 A1* | 5/2014 | Damnjanovic | H04W 52/30 370/336 |
| 2014/0161110 A1* | 6/2014 | Kim | H04L 5/001 370/336 |
| 2014/0177602 A1* | 6/2014 | Chen | H04W 52/04 370/336 |
| 2015/0043543 A1* | 2/2015 | Uchino | H04W 56/0045 370/336 |
| 2015/0063317 A1* | 3/2015 | Park | H04W 56/0005 370/336 |
| 2015/0180628 A1* | 6/2015 | Kim | H04B 7/0667 370/336 |
| 2015/0181547 A1* | 6/2015 | Dinan | H04L 5/005 370/336 |
| 2015/0341150 A1* | 11/2015 | Seo | H04B 7/2656 370/336 |
| 2015/0350927 A1* | 12/2015 | Dahiya | H04W 56/00 370/312 |
| 2015/0373738 A1* | 12/2015 | Papasakellariou | H04L 12/18 370/336 |
| 2016/0044666 A1* | 2/2016 | Shin | H04W 72/1278 370/336 |
| 2017/0325225 A1* | 11/2017 | Dinan | H04W 72/0446 |
| 2019/0045345 A1* | 2/2019 | Lee | H04W 4/70 |
| 2019/0090126 A1* | 3/2019 | Hayashi | H04W 72/0446 |
| 2019/0150148 A1* | 5/2019 | Ouchi | H04W 72/0446 370/336 |

\* cited by examiner

METHOD AND APPARATUS FOR ADJUSTING TIMING IN WIRELESS COMMUNICATION SYSTEM

CROSS-REFERENCE TO RELATED APPLICATIONS AND CLAIM OF PRIORITY

This application is based on and claims priority under 35 U.S.C. § 119 to Korean Patent Application No. 10-2017-0037148 filed on Mar. 23, 2017 in the Korean Intellectual Property Office, the disclosure of which is incorporated herein by reference in its entirety.

TECHNICAL FIELD

The present disclosure relates to a method and an apparatus for timing adjustment/alignment in a wireless communication system. Further, the present disclosure relates to a timing alignment between a desired signal and an interference signal in a dynamic time division duplex (TDD) system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

On the other hand, if there exist high interference effects between terminals belonging to adjacent base stations, the base stations are tied in clusters, and uplink/downlink (UL/DL) configuration is determined by reflecting UL/DL traffic ratios of users in the clusters. That is, according to a clustering technique, all base stations in the clusters have the same UL/DL configuration. Such an interference technique is a technique to avoid the interference itself, and reception timing misalignment between an interference signal and a desired signal does not matter. However, the interference technique has the drawback that the achievable overall system performance deteriorates. Accordingly, there is a need for a method for interference cancellation in a system to which a dynamic TDD system is applied.

SUMMARY

An aspect of the present disclosure is to provide a method and an apparatus for timing adjustment/alignment in a wireless communication system. Another aspect of the present disclosure is to provide a method and an apparatus for timing alignment between a desired signal and an interference signal in a dynamic TDD system.

In accordance with an aspect of the present disclosure, a method for operating a terminal includes receiving timing advance (TA) information related to an interference; determining whether to apply the TA information related to the interference; and transmitting uplink data based on the TA information related to the interference.

In accordance with another aspect of the present disclosure, a terminal includes a transceiver configured to transmit and receive signals; and at least one processor configured to receive timing advance (TA) information related to an interference, to determine whether to apply the TA information related to the interference, and to transmit uplink data based on the TA information related to the interference.

In accordance with still another aspect of the present disclosure, a method for operating a base station includes determining a direction of an n-th slot to be different from a reference transmission direction; determining TA information related to an interference to be applied to the n-th slot; transmitting the TA information related to the interference to a terminal; and receiving from the terminal uplink data whose timing is adjusted based on the TA information related to the interference.

In accordance with yet still another aspect of the present disclosure, a base station includes a transceiver configured to transmit and receive signals; and at least one processor configured to determine a direction of an n-th slot to be different from a reference transmission direction, to determine TA information related to an interference to be applied to the n-th slot, to transmit the TA information related to the interference to a terminal, and to receive from the terminal uplink data whose timing is adjusted based on the TA information related to the interference.

The subject matters to be achieved by the present disclosure are not limited to those as described above, and other unmentioned subject matters would be clearly understood by those of ordinary skill in the art to which the present disclosure pertains from the following description.

According to the aspects of the present disclosure, it is possible to provide a method and an apparatus for timing adjustment/alignment in a wireless communication system. Further, according to the aspects of the present disclosure, it is possible to provide a method and an apparatus for timing alignment between a desired signal and an interference signal in a dynamic time division duplex (TDD) system.

Further, according to the aspects of the present disclosure, it is possible to perform timing alignment between a desired signal and a crosslink interference (TRP-to-TRP/UE-to-UE interference) occurring due to the dynamic TDD. Further, according to the aspects of the present disclosure, it is possible to perform measurement and cancellation to mitigate the crosslink interference. Further, according to the aspects of the present disclosure, it is possible to effectively avoid and cancel the crosslink interference, and thus performance improvement or latency reduction that can be obtained through the dynamic TDD can be achieved.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
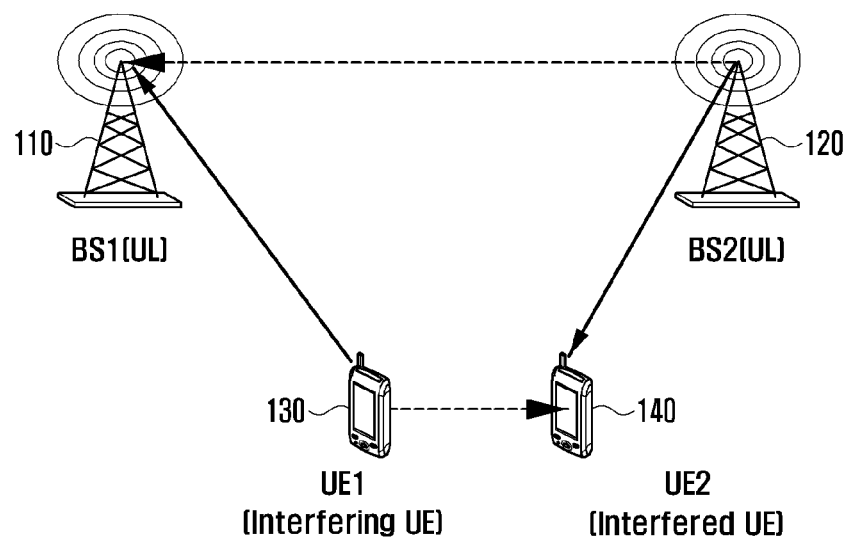
FIG. 1 is a diagram illustrating a system in which timing misalignment occurs according to an embodiment of the present disclosure.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, preferred embodiments of the present disclosure will be described in detail with reference to the accompanying drawings. In the accompanying drawings, it is to be noted that the same reference numerals are used for the same constituent elements. Further, a detailed description of known functions and configurations will be omitted if it obscures the subject matter of the present disclosure.

In explaining embodiments of the present disclosure, explanation of technical contents which are well known in the art to which the present disclosure pertains and are not directly related to the present disclosure will be omitted. This is to transfer the subject matter of the present disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in an embodiment, means, but is not limited to, a software or hardware component, such as FPGA or ASIC, which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card.

Hereinafter, embodiments of the present disclosure will be described in detail with reference to the accompanying drawings. In describing the present disclosure, a detailed description of related known functions or configurations will be omitted if it is determined that it obscures the disclosure in unnecessary detail. Further, all terms used in the description are general terms that are widely used in consideration of their functions in the present disclosure, but may differ depending on intentions of a person skilled in the art to which the present disclosure belongs, customs, or appearance of new technology. Accordingly, they should be defined based on the contents of the whole description of the present disclosure.

An embodiment of the present disclosure relates to a method for timing alignment between a desired signal and an interference signal used to avoid or cancel a crosslink interference (TRP-to-TRP interference/UE-to-UE interference) occurring in a dynamic TDD system that intends to improve frequency efficiency and latency through different uplink/downlink configurations between base stations by reflecting the traffic characteristics of the respective base stations.

According to a clustering technique, situations in which respective base stations can independently apply a dynamic TDD are limited, and thus the overall system performance capable of being improved by the dynamic TDD is limited. In order for the respective base stations in clusters or communication networks to independently perform the dynamic TDD, it is required to consider an interference cancellation technique, a listen before talk (LBT) based interference cancellation technique, and power control and coordination techniques together. In order to make it possible to apply such various interference cancellation/management techniques, it is required to solve a reception timing misalignment problem between an interference signal and a desired signal. In an embodiment of the present disclosure, a method for solving such a timing misalignment problem is provided.

An embodiment of the present disclosure may be applied to a mobile communication system operating as a TDD and a dynamic TDD. Further, an embodiment of the present disclosure considers a communication system composed of a plurality of base stations and a plurality of terminals operating in a TDD system. The base station may be called a base station, node B, eNodeB, BS, or gNB. The terminal may be called UE or a terminal. In an embodiment of the present disclosure, TA information related to the interference may be called TA information or new TA information.

FIG. 1 is a diagram illustrating a system in which timing misalignment occurs according to an embodiment of the present disclosure.

Referring to FIG. 1, a mobile communication system may include a first base station (BS1) 110, a second base station (BS2) 120, a first terminal (UE1) 130, and a second terminal (UE2) 140. The first base station 110 is a serving base station of the first terminal 130, and the second base station 120 is a serving base station of the second terminal 140. In FIG. 1, a solid line indicates a desired signal, and a dotted line indicates an interference signal. At a specific time, the first base station 110 receives an uplink signal from the first terminal 130 through uplink configuration, and the second base station 120 transmits a downlink signal to the second terminal 140 through downlink configuration. In this case, in the timing of receiving the uplink signal from the first terminal 130, the downlink signal that the second base station 120 transmits to the second terminal 140 may act as an interference with respect to the uplink signal. This may be called an interference between base stations, for example, a transmission and reception point (TRP) to TRP interference. In this case, in the first base station 110, the desired signal is the uplink signal transmitted by the first terminal 130, and the interference signal is the downlink signal transmitted by the second base station 120. Further, in the timing in which the second terminal 140 receives the downlink signal from the second base station 120, the uplink signal that the first terminal 130 transmits to the first base station 110 may act as an interference with respect to the downlink signal. This may be called an interference between terminals, for example, UE to UE interference. In this case, the desired signal, in the second terminal 140, the desired signal is the downlink signal transmitted by the second base station 120, and the interference signal is the uplink signal transmitted by the first terminal 130.

Figure 2:
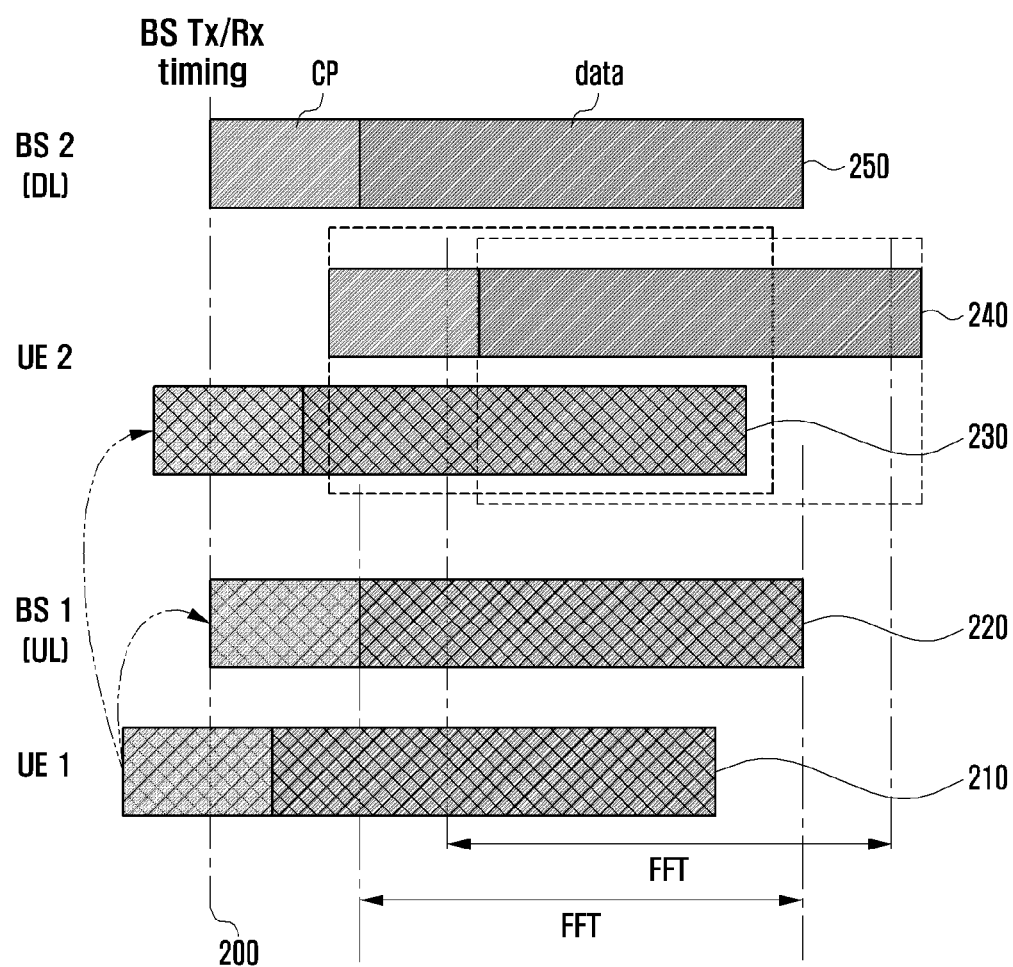
FIG. 2 is a diagram illustrating timing misalignment according to the embodiment of FIG. 1.

FIG. 2 is a diagram illustrating timing misalignment according to the embodiment of FIG. 1.

Referring to FIG. 2, a problem that timing misalignment occurs in the second terminal 140 in an embodiment of FIG. 1 will be described. In FIG. 2, the drawing reference numeral "210" denotes uplink transmission of the first terminal, "220" denotes uplink reception of the first base station, and "230" denotes that the second terminal receives the uplink signal transmitted by the first terminal. Further, "240" denotes that the second terminal receives the downlink signal transmitted by the second base station, and "250" denotes downlink signal transmission of the second base station. Further, in FIG. 2, a horizontal direction represents a timing.

The drawing reference numeral "200" denotes transmission/reception timing reference of the base station. In order to make the transmission signal transmitted by the first terminal arrive at the first base station before the transmission/reception timing reference 200 of the base station, the first terminal transmits the uplink signal at a time earlier than the transmission/reception timing reference 200. Accordingly, there exists a timing difference between the uplink signal transmission of the first terminal and the uplink signal reception of the first base station. The uplink signal transmitted by the first terminal may act as an interference against the second terminal, and the second terminal can receive the signal transmitted at a specific time by the first terminal at a time earlier than the transmission/reception timing reference 200 of the base station as denoted by the drawing reference numeral "230". On the other hand, the second base station transmitting the downlink signal for the second terminal can transmit the downlink signal for the second terminal in the transmission/reception timing reference 200 of the base station. Accordingly, the downlink signal arrives at the second terminal at a time later than the transmission/reception timing reference 200 of the base station.

As illustrated in the drawing, since the first base station allocates the uplink and the second base station allocates the downlink to make different TDD configurations (allocation of different transmission directions), it can be known that timing misalignment occurs between the reception timing of the desired signal of the second terminal belonging to the downlink and the signal transmitted from the first terminal belonging to the uplink (interference signal between the terminals). In the second terminal, the timing misalignment corresponds to a case where a timing difference between the interference signal 230 from the first terminal and the desired signal 240 from the second base station is larger than a cyclic prefix (CP). It may be defined that the timing misalignment occurs if there is no overlapping portion between CP regions of two reception signals. In FIG. 2, the drawing reference numerals "230" and "240" denote timing misalignment occurrence due to non-coincidence of the CP regions in a time domain.

As a result, this causes an inter-carrier interference (ICI) to occur in detecting the desired signal or the interference signal. Accordingly, it is helpful to adjust the transmission time of a transmission node so that the timing misalignment between the desired signal and the interference signal does not occur.

In an embodiment of the present disclosure, explanation will be made through division into a case where a reference transmission direction corresponds to the downlink and a case where the reference transmission direction corresponds to the uplink. The reference transmission direction means the direction of the uplink or the downlink being identically applied by a plurality of base stations in accordance with the TDD configuration. Change of the reference transmission direction from the downlink to the uplink means that a downlink subframe is dynamically changed to an uplink subframe in accordance with the dynamic TDD configuration in a transmission time interval (TTI) being operated in accordance with the TDD configuration. Change of the reference transmission direction from the uplink to the downlink means that an uplink subframe is dynamically changed to a downlink subframe in accordance with the dynamic TDD configuration in the TTI being operated in accordance with the TDD configuration. The reference transmission direction may be called a reference direction.

Figure 3:
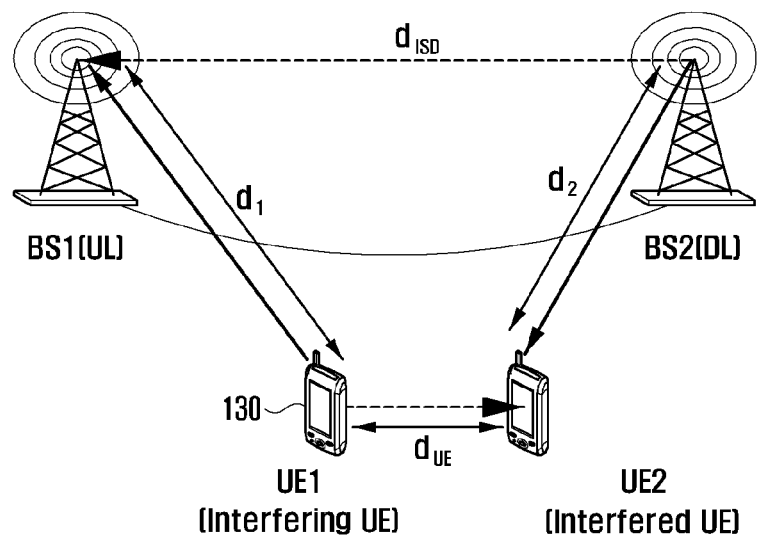
FIG. 3 is a diagram illustrating distances between respective nodes according to an embodiment of the present disclosure.

FIG. 3 is a diagram illustrating distances between respective nodes according to an embodiment of the present disclosure.

The distance between the first base station (BS1) and the first terminal (UE1) is $d_1$, and the distance between the second base station (BS2) and the second terminal (UE2) is $d_2$. The distance between the first base station (BS1) and the second base station (BS2) is $d_{ISD}$, and the distance between the first terminal (UE1) and the second terminal (UE2) is $d_{UE}$. In this case, $d_{UE}$ indicates the distance between the first terminal (UE1) belonging to an adjacent cell and the second terminal (UE2) belonging to a serving cell, and $d_{IDS}$ indicates the distance between the base station (BS1) of the adjacent cell and the base station (BS2) of the serving cell.

In addition, in an embodiment of the present disclosure, the following parameters may be used.

$T_{CP}$ indicates a length of a cyclic prefix (CP), and $t_{UL-DL}$ indicates a UL-DL switching time. $t_W$ means a window length used to satisfy a spectrum mask, and C means the speed of light.

Figure 4A:
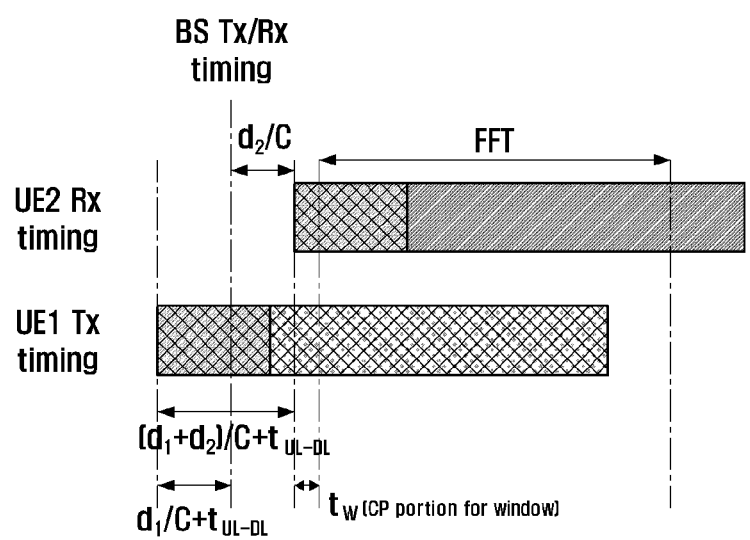
FIGS. 4A and 4B are diagrams illustrating timing misalignment between a desired signal and an interference signal according to an embodiment of the present disclosure.
Figure 4B:
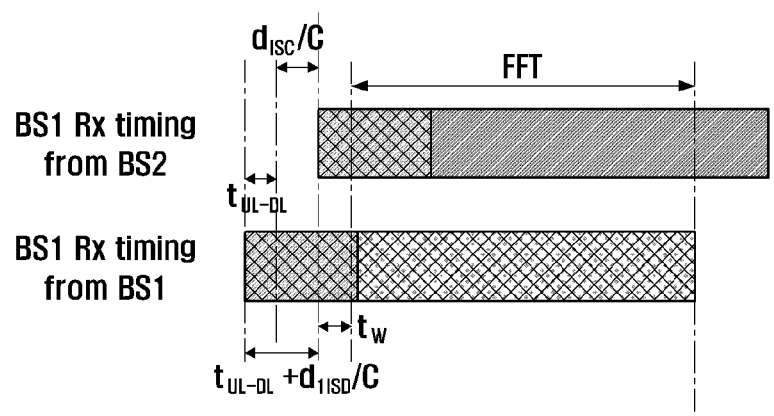

FIGS. 4A and 4B are diagrams illustrating timing misalignment between a desired signal and an interference signal according to an embodiment of the present disclosure. FIG. 4A illustrates a timing misalignment situation between UE-to-UE interference and a desired downlink signal. Distances between serving base stations of respective UEs, UL-DL switching time, and a distance between the UEs exert an influence on the timing misalignment. Further, a window length $t_W$ used to satisfy the spectrum mask may exert an influence on the timing misalignment.

FIG. 4B illustrates a timing misalignment situation between TRP-to-TRP interference and a desired downlink signal. The distance between base stations and UL-DL switching time exert an influence on the timing misalignment. Further, the window length $t_W$ used to satisfy the spectrum mask may also exert an influence on the timing misalignment.

If a situation in which a condition expressed in mathematical expression 1 below occurs in a state where the window length $t_W$ for satisfaction of the spectrum mask is not considered, an inter-carrier interference (ICI) occurs against the interference signal or the desired signal due to the timing misalignment between the interference signal and the desired signal regardless of how a fast Fourier transform (FFT) region is configured, and thus a problem may occur in detecting and/or measuring the interference signal or the desired signal.

[Mathematical Expression 1]

$$T_{CP} \leq \max\left\{\mod\left(\frac{d_1+d_2}{C}+t_{UL-DL}-\frac{d_{UE}}{C}, T_{OFDM}\right),\right.$$
$$\left.\mod\left(\frac{d_{ISD}}{C}+t_{UL-DL}, T_{OFDM}\right)\right\} \leq T_{OFDM}-T_{CP}$$

If a situation in which a condition expressed in mathematical expression 2 below occurs in a state where the window length $t_W$ for satisfaction of the spectrum mask is considered, an inter-carrier interference (ICI) occurs against the interference signal or the desired signal due to the timing misalignment between the interference signal and the desired signal regardless of how an FFT region is configured, and thus a problem may occur in detecting and/or measuring the interference signal or the desired signal.

[Mathematical Expression 2]

$$T_{CP}-t_W \leq \max\left\{\mod\left(\frac{d_1+d_2}{C}+t_{UL-DL}-\frac{d_{UE}}{C}, T_{OFDM}\right),\right.$$
$$\left.\mod\left(\frac{d_{ISD}}{C}+t_{UL-DL}, T_{OFDM}\right)\right\} \leq T_{OFDM}-T_{CP}+t_w$$

Figure 5A:
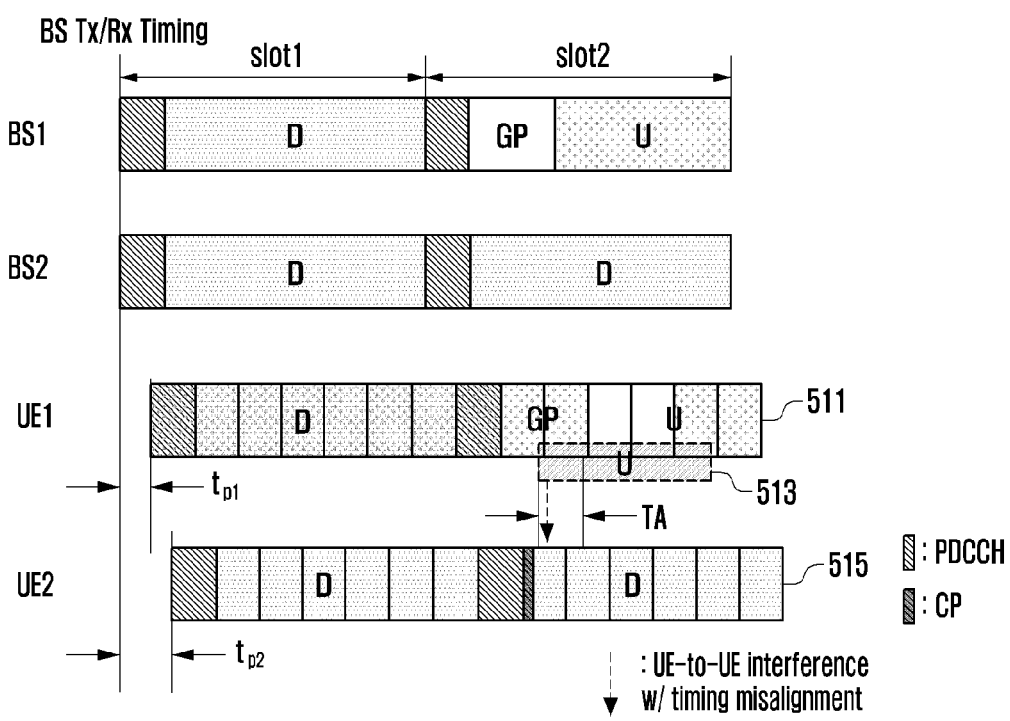
FIGS. 5A and 5B, 6A and 6B, and 7A and 7B are diagrams illustrating timing misalignment and a process of solving the timing misalignment according to an embodiment of the present disclosure.
Figure 5B:
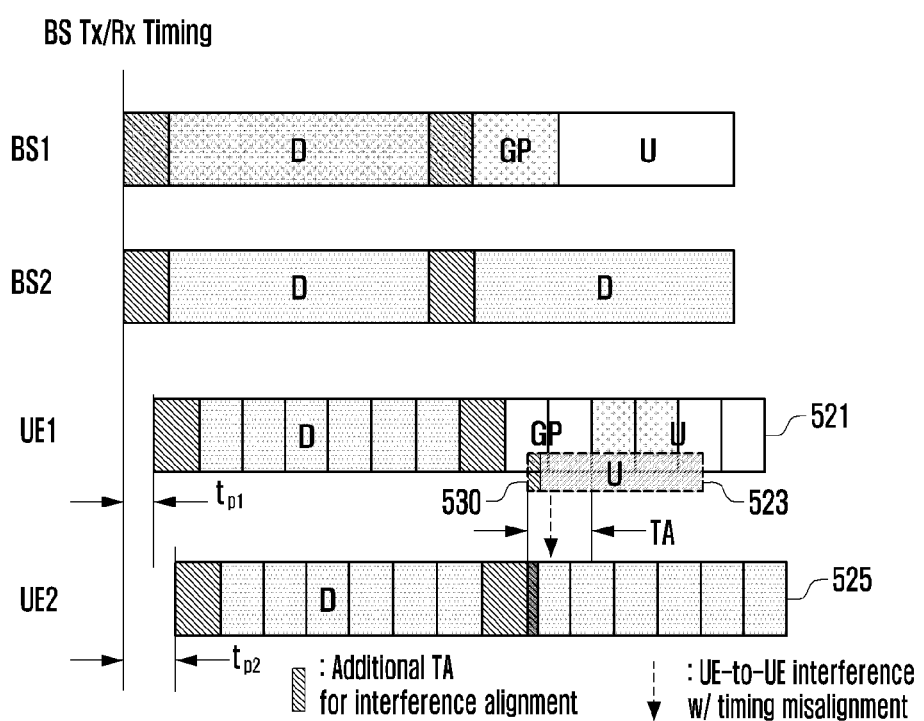

FIGS. 5A and 5B are diagrams illustrating timing misalignment and a process of solving the timing misalignment according to an embodiment of the present disclosure. FIG. 5A is a diagram illustrating the timing misalignment, and FIG. 5B is a diagram illustrating a process of solving the timing misalignment.

Referring to FIG. 5A, a frame is composed of slots. A slot may include a plurality of symbols. The first slot of BS1 is a downlink slot, but the second slot has been changed to an uplink slot. Both of the first and second slots of BS2 are downlink slots. The frame structure of FIGS. 5A and 5B can be equally applied to FIGS. 6A and 6B and 7A and 7B.

The drawing reference numeral "511" denotes timing in which BS1 receives an uplink signal from UE1, "513" denotes timing in which UE2 receives an interference signal from UE1, and "515" denotes timing in which UE2 receives a downlink signal from BS2. For timing alignment, a CP region of 513 and a CP region of 515 should overlap each other, but if the timing of reception of the 513 signal is too early, the CP regions do not overlap each other, and this may be determined as the timing misalignment.

Referring to FIG. 5B, the timing misalignment problem can be solved by adjusting the timing in which UE1 transmits the uplink signal. In order to solve the timing misalignment problem between the inter-UE interference and the downlink desired signal as described above, as illustrated in FIG. 5B, the timing misalignment problem can be solved through addition of a timing advance value transmitted by the terminal of a cell changing the downlink corresponding to the reference direction to the uplink. The timing advance may be called timing adjustment.

The drawing reference numeral "521" denotes timing in which BS1 receives an uplink signal from UE1, "523" denotes timing in which UE2 receives an interference signal from UE1, and "525" denotes timing in which UE2 receives a downlink signal from BS2. Through additional timing advance 530, it becomes possible to advance the transmission time of the uplink signal transmitted by UE1. Through this, the timing can be controlled so that the CP region of the drawing reference numeral "523" and the CP region of "525" overlap each other, and through this, the timing misalignment problem can be solved.

Figure 6A:
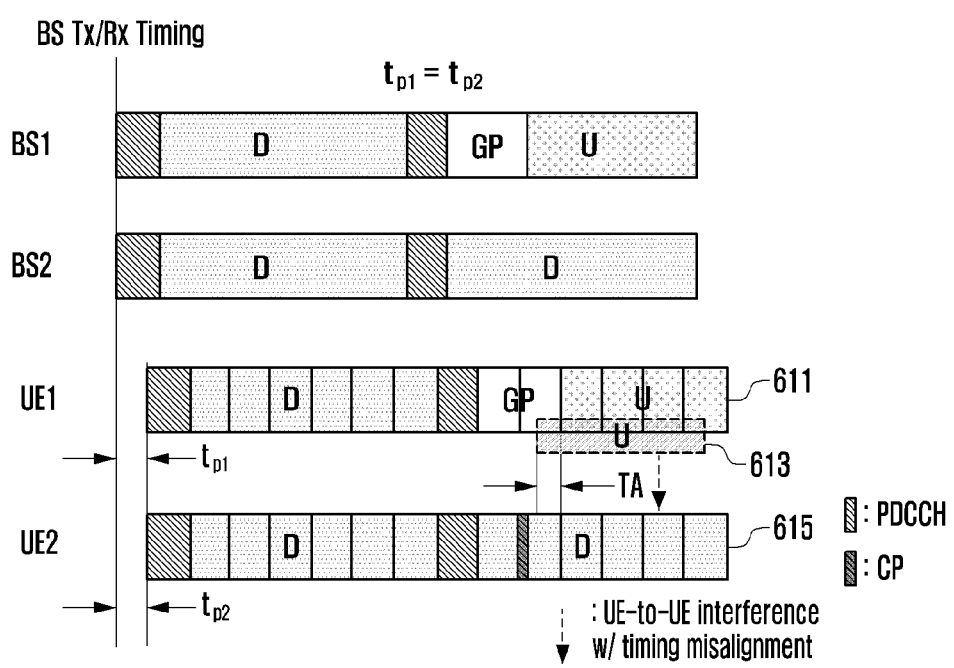
Figure 6B:
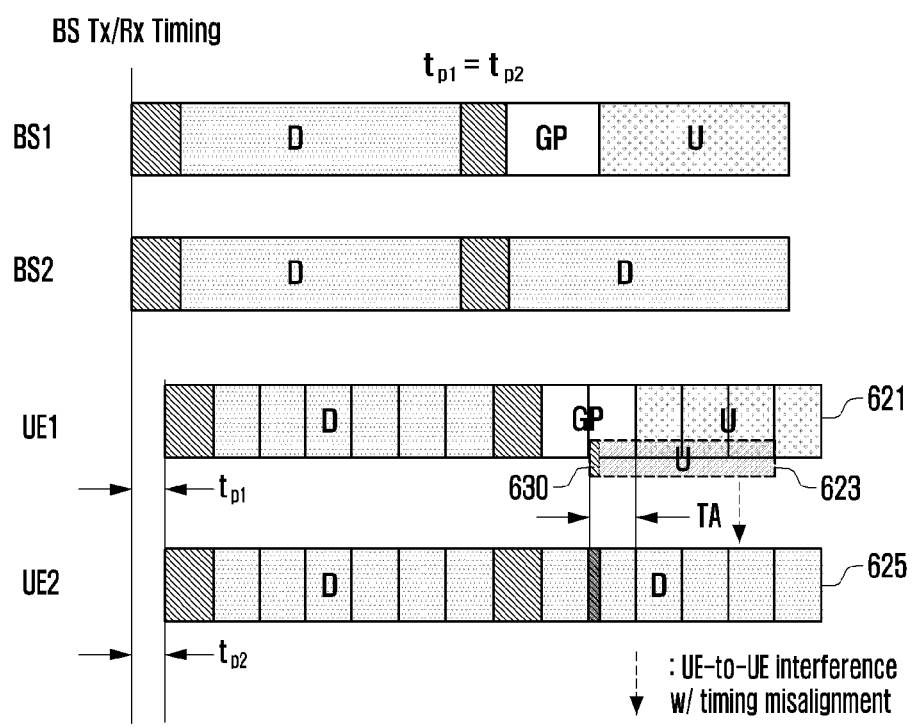

FIGS. 6A and 6B are diagrams illustrating timing misalignment and a process of solving the timing misalignment according to an embodiment of the present disclosure. FIG. 6A is a diagram illustrating the timing misalignment, and FIG. 6B is a diagram illustrating a process of solving the timing misalignment.

FIGS. 5A and 5B are diagrams illustrating a case where a propagation delay of UE1 and a propagation delay of UE2 are different from each other, and FIGS. 6A and 6B are diagrams illustrating a case where a DL corresponding to the reference direction is changed to a UL against a case where UE1 and UE2 have the same propagation delay.

Referring to FIG. 6A, the drawing reference numeral "611" denotes timing in which BS1 receives an uplink signal from UE1, "613" denotes timing in which UE2 receives an interference signal from UE1, and "615" denotes timing in which UE2 receives a downlink signal from BS2. For timing alignment, a CP region of 613 and a CP region of 615 should overlap each other, but if the timing of reception of the 613 signal is too later, the CP regions do not overlap each other, and this may be determined as the timing misalignment.

Referring to FIG. 6B, the timing misalignment problem can be solved by adjusting the timing in which UE1 transmits the uplink signal. In order to solve the timing misalignment problem between the inter-UE interference and the downlink desired signal as described above, as illustrated in FIG. 6B, the timing misalignment problem can be solved through addition of a timing advance value transmitted by the terminal of a cell changing the downlink corresponding to the reference direction to the uplink.

The drawing reference numeral "621" denotes timing in which BS1 receives an uplink signal from UE1, "623" denotes timing in which UE2 receives an interference signal from UE1, and "625" denotes timing in which UE2 receives a downlink signal from BS2. Through additional timing advance 630, it becomes possible to advance the transmission time of the uplink signal transmitted by UE1. Through this, the timing can be controlled so that the CP region of the drawing reference numeral "623" and the CP region of "625" overlap each other, and through this, the timing misalignment problem can be solved.

Figure 7A:
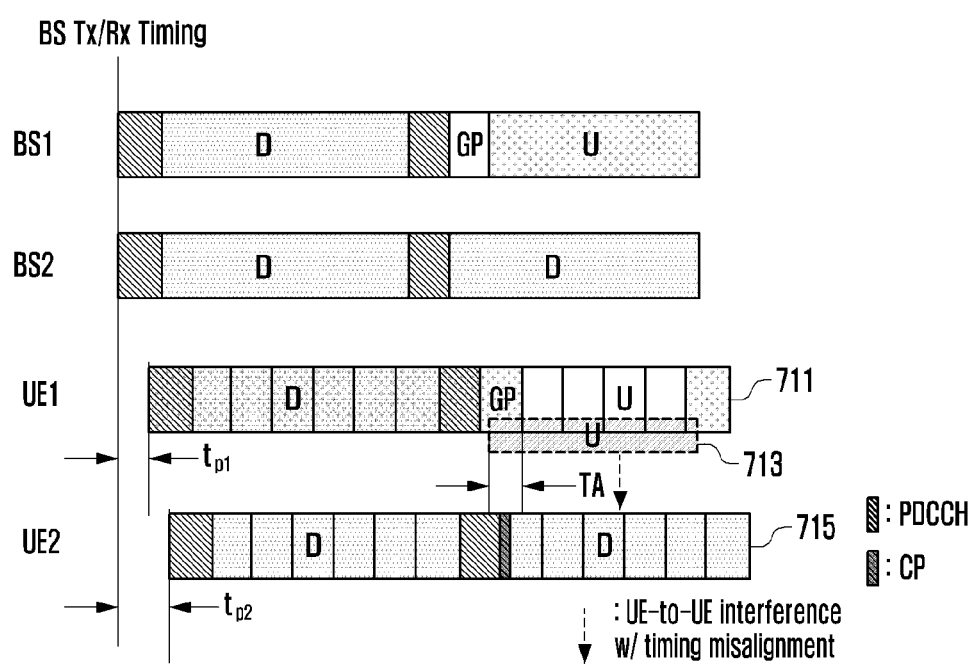
Figure 7B:
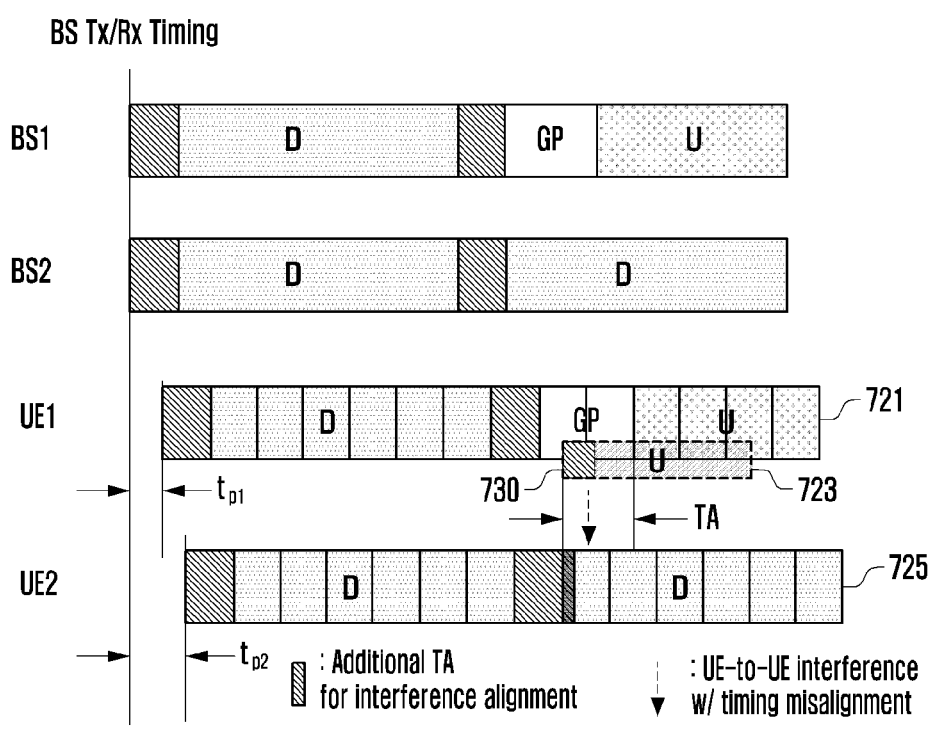

FIGS. 7A and 7B are diagrams illustrating timing misalignment and a process of solving the timing misalignment according to an embodiment of the present disclosure. FIG. 7A is a diagram illustrating the timing misalignment, and FIG. 7B is a diagram illustrating a process of solving the timing misalignment.

FIGS. 7A and 7B illustrate an embodiment in a case where a timing advance value to be added exceeds a guard period (GP) range currently allocated. The embodiment illustrated in FIGS. 7A and 7B performs an additional timing advance after additionally allocating the GP.

Referring to FIG. 7A, the drawing reference numeral "711" denotes timing in which BS1 receives an uplink signal from UE1, "713" denotes timing in which UE2 receives an interference signal from UE1, and "715" denotes timing in which UE2 receives a downlink signal from BS2. For timing alignment, a CP region of 713 and a CP region of 715 should overlap each other, but if the timing of reception of the 713 signal is too early, the CP regions do not overlap each other, and this may be determined as the timing misalignment. On the other hand, timing adjustment for this is necessary, and if a timing adjustment value exceeds a GP range currently configured, it is necessary to adjust the length of the GP for the timing adjustment.

Referring to FIG. 7B, the timing misalignment problem can be solved by adjusting the timing in which UE1 transmits the uplink signal. In order to solve the timing misalignment problem between the inter-UE interference and the downlink desired signal as described above, as illustrated in FIG. 7B, the timing misalignment problem can be solved by adjusting the GP length of a cell changing the downlink corresponding to the reference direction to the uplink and adding a timing advance value transmitted by the terminal.

The drawing reference numeral "721" denotes timing in which BS1 receives an uplink signal from UE1, "723" denotes timing in which UE2 receives an interference signal from UE1, and "725" denotes timing in which UE2 receives a downlink signal from BS2. Through lengthening of the GP length of the corresponding slot and additional timing advance 730, it becomes possible to advance the transmission time of the uplink signal transmitted by UE1. Through this, the timing can be controlled so that the CP region of the drawing reference numeral "723" and the CP region of "725" overlap each other, and the timing misalignment problem can be solved by adjusting the additional timing so that the additional timing adjustment does not exceed the GP length.

Next, a method for allocating a TA will be described. In an embodiment of the present disclosure, when a dynamic TDD system performs the additional timing advance for the timing adjustment between the desired signal and the inter-UE interference, at least one of condition 1, condition 2, and condition 3 may be considered. For example, an additional timing advance $t_{LA}$ can be configured. The conditions 1, 2, and 3 are as follows.

$$\mathrm{mod}(t_{P1}+t_{P2}+t_{UL\text{-}DL}+t_{LA},T_{OFDM}) \geq T_{OFDM}-(T_{CP}-t_W) \quad \text{[Condition 1]}$$

$$\mathrm{mod}(t_{P1}+t_{P2}+t_{UL\text{-}DL}+t_{LA},T_{OFDM}) \leq (T_{CP}-t_W) \quad \text{[Condition 2]}$$

$$t_{LA} \leq GP-(t_{UL\text{-}DL}+2t_{P1}) \quad \text{[Condition 3]}$$

Figure 8A:
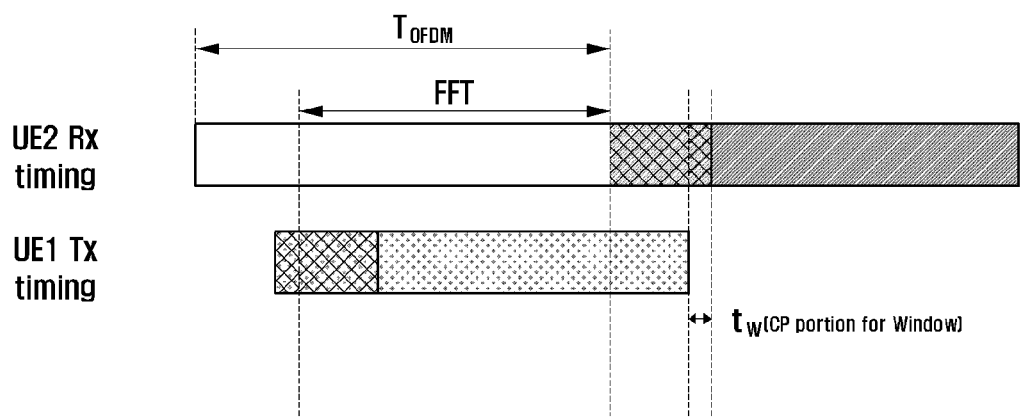
FIGS. 8A and 8B are diagrams illustrating an additional TA for timing adjustment according to an embodiment of the present disclosure.
Figure 8B:
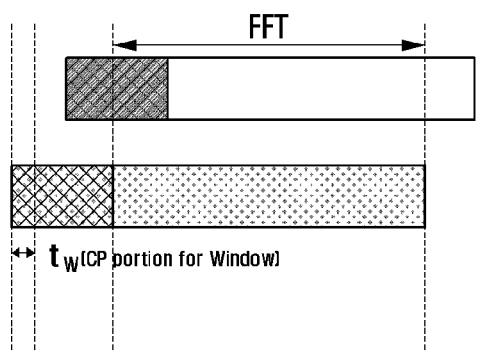

FIGS. 8A and 8B are diagrams illustrating an additional TA for timing adjustment according to an embodiment of the present disclosure. FIG. 8A shows an equality situation on condition 1, and FIG. 8B shows an equality situation on condition 2.

Condition 3 shows that the sum of a reference timing advance value and an additional timing advance value cannot exceed the GP value. As described above, if [(condition 1 or condition 2) and condition 3] is not satisfied through the GP currently allocated, an additional TA is performed after allocation of an additional GP.

On condition 1 and condition 2, in order for the first base station to obtain a propagation delay value $t_{P2}$ for the terminal of the second base station, delay occurs, and for $t_{P1}+t_{P2}$, the $t_{ISD}$ or $t_{P2}$ value may be replaced by $t_{ISD}/2$. In the case where $t_{P1}+t_{P2}$ is replaced by $t_{IDS}$, the condition 1 and condition 2 can be expressed as follows.

$$\mathrm{mod}(t_{ISD}+t_{UL\text{-}DL}+t_{LA,2},T_{OFDM}) \geq T_{OFDM}-(T_{CP}-t_W) \quad \text{[Condition 1-1]}$$

$$\mathrm{mod}(t_{ISD}+t_{UL\text{-}DL}+t_{LA,2},T_{OFDM}) \leq (T_{CP}-t_W) \quad \text{[Condition 2-1]}$$

In case where the CP component $t_W$ used for the window is not considered, the conditions 1 and 2 may be expressed as follows.

$$\mathrm{mod}(t_{P1}+t_{P2}+t_{UL\text{-}DL}+t_{LA,2},T_{OFDM}) \geq T_{OFDM}-T_{CP} \quad \text{[Condition 1-2]}$$

$$\mathrm{mod}(t_{P1}+t_{P2}+t_{UL\text{-}DL}+t_{LA,2},T_{OFDM}) \leq T_{CP} \quad \text{[Conditions 2-2]}$$

Figure 9A:
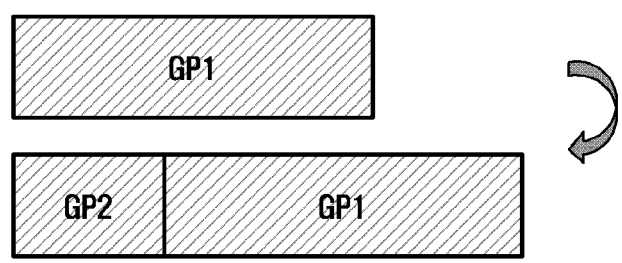
FIGS. 9A and 9B are diagrams illustrating an additional guard period (GP) allocation method according to an embodiment of the present disclosure.
Figure 9B:
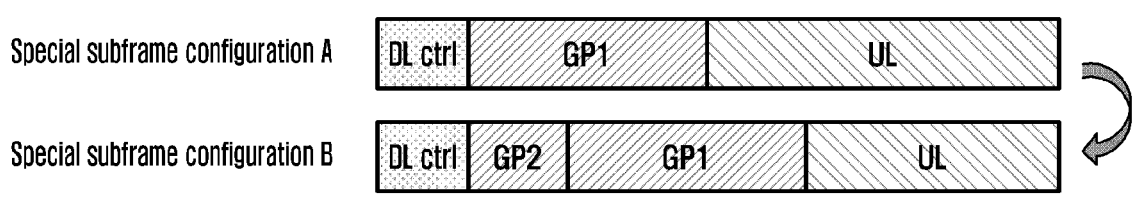

FIGS. 9A and 9B are diagrams illustrating an additional guard period (GP) allocation method according to an embodiment of the present disclosure.

Referring to FIGS. 9A and 9B, a method for additionally allocating a GP may be briefly classified into two methods: a method using GP duration information and a method using special subframe configuration information.

FIG. 9A illustrates a method using GP duration information. In case of a semi-static operation (i.e., in case of operating the same DL/UL configuration between base stations), the base station allocates GP1 in consideration of a round trip time (RTT) and a required switching time. In case of a dynamic operation (i.e., in case of operating different DL/UL configurations between the base stations), GP2 is additionally allocated in addition to the allocated GP1 in consideration of the RTT and the required switching time. That is, referring to FIG. 9A, if an additional allocation of the GP is necessary during the dynamic TDD operation (condition 3 or the like), GP2 may be additionally allocated.

FIG. 9B illustrates a method using special subframe configuration information. In case of a semi-static operation, the base station allocates a special subframe configuration A in consideration of the RTT and the required switching time. In case of a dynamic operation, if needed, the base station allocates special subframe configuration B having a larger GP. In the present disclosure, special subframe configuration with different GP lengths can be used in the same method. For this, it is helpful to introduce special subframe configuration in consideration of a crosslink interference (CLI), and it is helpful to introduce a special subframe having a GP further including an additional OFDM symbol rather than the GP of the special subframe in case where the CLI is not considered.

Next, a method for a base station to perform signaling of GP information to a terminal will be described. GP operation schemes may be classified into two schemes: a scheme for transferring two kinds of GP components or two kinds of special subframe configurations to one terminal and a method for providing information on a reference GP or a reference special subframe configuration and then, if needed, additionally providing configuration information for the GP or special subframe.

Option 1: First, information on two kinds of GPs or two kinds of special subframe configurations may be transferred to the terminal. A message for transferring the information is not limited to an RRC message.

Option 2: Next, a reference GP duration or special subframe configuration 1 is transferred through an RRC message, and information on an additional GP or special subframe B is transferred to a terminal through a DCI. The above-described message is not limited to the RRC message and the DCI. In case of a base station changing the DL to the UL, an additional GP duration or special subframe configuration B having a longer GP may be transferred to terminals.

The above-described operation schemes will be described in more detail. First, according to option 1, additional GP duration or special subframe configuration B (having a relatively long GP) is transferred to the terminal through the RRC message in addition to the reference GP or reference special subframe configuration A (having a relatively short GP). If the semi-static U/D configurations are not changed, the terminal operates with the reference GP or reference special subframe configuration A. If the base station changes the reference transmission direction from DL to UL, the terminal operates using the GP obtained by adding the additional GP to the reference GP or special subframe configuration B. The following figure shows an embodiment of the RRC message for transferring GP/special subframe configuration information.

```
TDD-Config ::=            SEQUENCE {
    GuardPeriodDuration1  ENUMERATED {gpd0, gpd1, gpd2,
                          gpd3, gpd4, gpd5, gpd6, gpd7,
                          gpd8, ..., gpdK}
    GuardPeriodDuratrion2 ENUMERATED {gpd0, gpd1, gpd2,
                          gpd3, gpd4, gpd5, gpd6, gpd7,
                          gpd8, ..., gpdK}
}
TDD-Config ::=              SEQUENCE {
    SpecialSubframePatterns1 ENUMERATED {ssp0, ssp1, ssp2,
                             ssp3, ssp4,ssp5, ssp6, ssp7,
                             ssp8, ..., sspK}
    SpecialSubframePatterns2 ENUMERATED {ssp0, ssp1, ssp2,
                             ssp3, ssp4,ssp5, ssp6, ssp7,
                             ssp8, ..., sspK}
}
```

In the above figure, GuardPeriodDurationl indicates a reference GP length, and GuardPeriodDuration2 indicates an additional GP length or a length of reference GP+additional GP. Further, SpecialSubframePatterns1 indicates the reference special subframe configuration A, and SpecialSubframePatterns2 indicates the special subframe configuration B.

In case of option 2, three kinds of alternatives exist. According to the first alternative, the base station transfers reference configuration information for the special subframe (slot)/mixed subframe (slot) including the GP to the terminal through the RRC message, and the base station changing the transmission direction from DL to UL transfers configuration information of new special subframe (slot)/mixed subframe (slot) to the terminals through the DCI. According to the second alternative, the base station transfers the reference configuration information for the special subframe (slot)/mixed subframe (slot) including the GP through the RRC message, and the base station changing the transmission direction from DL to UL transfers one-bit information on whether an additional GP duration occurs to the terminals of the corresponding base station through the DCI configuration information of new special subframe (slot)/mixed subframe (slot) to the terminals through the DCI. The terminals having received an oneObit indicator may add one OFDM symbol or a GP having an engaged length as an additional GP. That is, it becomes possible to use a slot configuration having a larger GP as much as one OFDM symbol than the reference special subframe configuration. According to the third alternative, the base station transfers the reference configuration information for the special subframe (slot)/mixed subframe (slot) including the GP through the RRC message, and the base station changing the transmission direction from DL to UL transfers two-bit information on an additional GP duration size to the terminals of the corresponding base station through the DCI.

An embodiment of the third alternative will be described as follows.
Embodiment 1) 00: 1 OFDM symbol is added, 01: 2-OFDM symbols are added, 10: 3-OFDM symbols are added, and 11: 4-OFDM symbols are needed.
Embodiment 2) 00: 1 OFDM symbol is added, 01: 2-OFDM symbols are added, 10 and 11: reserved A timing advance command (TAC) may add a new TAC RRC/DCI in addition to the TAC sent to an existing medium access control (MAC) random access response (RAR) and the TAC transmitted through a MAC CE as follows.

timing advance command in MAC random access response (RAR)
Determine the necessary number of bits in consideration of propagation delay (coverage) and a switching time ($t_{UL\text{-}DL}$) of the base station
For example (11 bits): an index value $T_A$ (0, 1, 2 . . . 1282)
The amount of the time alignment: $N_{TA}=T_A \times 16$
The Timing Advance obtained via RAR is always positive
Example ($T_A=1$): If $T_A=1$, then Timing Adjustment=$N_{TA}=16$ Ts=16/30720000 sec=0.5208 μss (Distance=$(3 \times 10_8 \times 0.5208 \times 10_{-6})/2=78.12$ m which is the minimum)
Timing Advance Command MAC CE
Relative Timing Advance
For example (6 bits): an index value $T_A$ (0, 1, 2 . . . 63)
$N_{TA,new}=N_{TA,old}+(T_A\ 31)\times16$
$N_{TA,old}$ is the current timing adjustment and
$N_{TA,new}$ indicates new value.
new TAC RRC/DCI
DCI: Determine the necessary number of bits in consideration of a CP duration or the like for a window necessary for FFT duration and spectrum mask satisfaction
Maximum addition time advance: FFT duration+$t_W$ (e.g., 66.7+0.16=66.86)
For example (8 bits): an index value $T_A$ (0, 1, 2, . . . , K), Here, K is equal to or larger than 129 (cf. 16*128=2048).
The amount of the time alignment: $N_{TA}=T_A \times 16$ Ts
Hybrid (RRC+DCI)

Information transmitted through the TAC DCI is an additional timing advance value that is helpful for timing adjustment between the interference signal and the desired signal. Through the TAC DCI, the overall time advance information may be transferred. In this case, the terminal may disregard the TAC information previously received and may apply information received through the DCI to the corresponding TTI/slot/subframe. However, if a subframe operation of the base station follows the reference UL/DL configuration again, the TAC information is used in TTI/slot/subframe using the reference UL/DL configuration. The TAC DCI may be transferred through a UE-specific signaling or UE-common signaling. A timing advance command received at TTI/slot/subframe #n adjusts UL transmission in TTI/slot/subframe (n+k). Here, k has a value that is equal to or larger than 1. For example, k may be 4.

Techniques of performing timing alignment between the desired signal and the crosslink interference using both the RRC and the DCI are briefly classified into four methods as follows.

[Method 1]
RRC: The base station transfers in advance an additional $t_{IA}$ value to the UE using the RRC message.
DCI: The additional $t_{IA}$ is applied using the one-bit indicator (explicit indication). For example, if the one-bit indicator value is 0, the additional $t_{IA}$ value is not applied, whereas if the one-bit indicator value is 1, the additional $t_{IA}$ value is applied.
[Method 2]
RRC: The base station transfers in advance an additional $t_{IA}$ value to the UE using the RRC message.
DCI: Whether to apply the value is determined in accordance with transmission (Tx) direction information (implicit indication). For example, if the base station changes a downlink subframe in a reference direction to an uplink subframe using the dynamic TDD, the additional $t_{TA}$ value is applied, whereas if the subframe in the reference direction is used as it is, the additional $t_{TA}$ value is not applied.

On the other hand, the transmission direction information and the indicator of the method 1 may be used together. That is, if the transmission direction information is changed, the indicator of method 1 may be considered.

[Method 3]

RRC: The base station transfers in advance a static additional $t_{TA}$ value to the UE using the RRC message.

DCI: (The additional $t_{TA}$ is applied using the one-bit indicator (explicit indication))+(an additionally dynamic additional $t_{TA}$ value is transmitted to the DCI)–

(Ex) static additional $t_{TA\_S}$ through the RRC): 6 bits, the dynamic additional $t_{TA\_S}$ through the DCI: 2 bits.

That is, if it is intended to apply the additional TA, this is for the purpose of canceling an instantaneous interference occurring due to the dynamic change of the subframe performed by the base station. Accordingly, the static additional TA corresponding to the characteristics according to a general wireless environment can be provided through the RRC message, and the dynamic additional TA corresponding to the characteristics of the instantaneous interference can be provided through the DCI.

[Method 4]

RRC: The base station transfers in advance a static additional $t_{TA}$ value to the UE using the RRC message.

DCI: (Whether to apply the additional $t_{TA}$ is determined in accordance with Tx direction information (explicit indication))+(an additionally dynamic additional $t_{TA}$ value is transmitted to the DCI)

According to the method 4, transmission direction information is applied without applying one-bit indicator information for the method 3.

Figure 10:
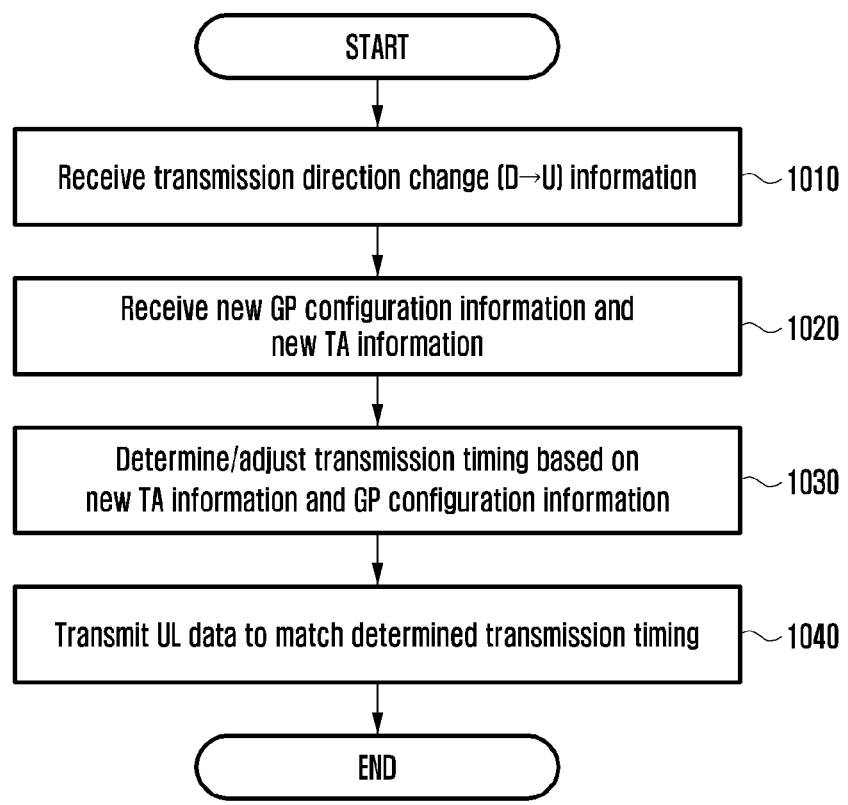
FIG. 10 is a diagram illustrating the operation of a terminal according to an embodiment of the present disclosure.

FIG. 10 is a diagram illustrating the operation of a terminal according to an embodiment of the present disclosure.

Referring to FIG. 10, at operation 1010, a terminal may receive transmission direction change information from a base station. The transmission direction change information may correspond to a case where a subframe or a slot is changed from a downlink to an uplink. The transmission direction change may mean a case where an uplink subframe or a subframe configured as a slot in accordance with a first TDD configuration is changed to a downlink subframe or a slot in accordance with a dynamic TDD configuration that is a second TDD configuration. The transmission direction change information may be explicit information, and may correspond to a case where the subframe or the slot is changed from the downlink to the uplink in accordance with the dynamic TDD configuration information. For example, the terminal may receive transmission direction change (D→U) information of the n-th TTI/slot/subframe from the base station.

At operation 1020, the terminal may receive GP configuration information and/or TA information from the base station. The GP configuration information may be additional GP configuration information. For example, the GP configuration information may be named new GP configuration information. The additional GP configuration information may be GP information, or may be information on special subframe configuration including an additional GP. As the specific operation, the GP allocation method as described above may be referred to. The terminal may receive the TA information from the base station. The TA information may be named new TA information. The TA information is additional TA information according to an embodiment of the present disclosure. Accordingly, it is new information discriminated from the TA information received from RAR or MAC CE. As the detailed example of receiving the TA information, the TA allocation method as described above is referred to.

The GP configuration information may be received before the operation 1010, or may be received after the operation 1010. The TA information may be received before the operation 1010, or may be received after the operation 1010. The GP information and the TA information may be simultaneously received, and other information may be received after specific information is received.

At operation 1030, the terminal may determine and/or adjust the uplink transmission timing based on the TA information and the GP configuration information. That is, the GP may be configured based on the GP configuration information or special subframe configuration information. Further, the timing advance value may be determined based on the TA information, and the uplink transmission timing may be adjusted.

At operation 1040, the terminal may transmit uplink data (UL data) to the base station to match the determined transmission timing.

The uplink transmission timing is adjusted in the above-described method, and in case where the uplink transmitted by the terminal in the dynamic TDD acts as an interference signal in another terminal, the CP portions do not overlap each other to solve the overlapping problem.

Figure 11:
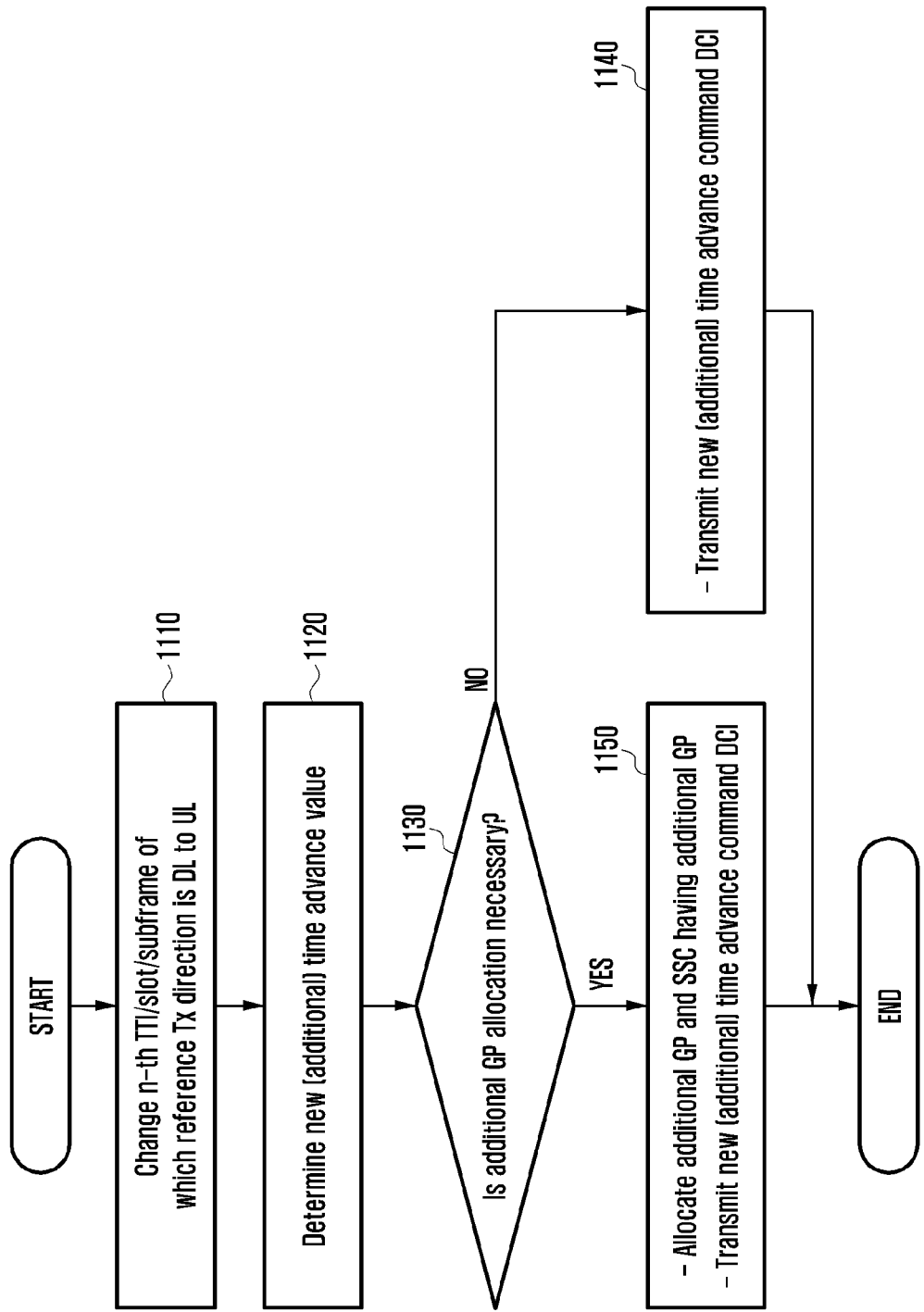
FIG. 11 is a diagram illustrating the operation of a base station according to an embodiment of the present disclosure.

FIG. 11 is a diagram illustrating the operation of a base station according to an embodiment of the present disclosure.

Referring to FIG. 11, at operation 1110, a base station may change a downlink that is a reference direction of a TDD subframe to an uplink. For example, it is possible to change the TTI/slot/subframe configured as the downlink in accordance with the first TDD configuration to the uplink. The base station may perform signaling according to the change or signaling for the change with respect to the terminal. The base station may change the n-th TTI/slot/subframe of which a reference transmission (Tx) direction is the downlink to the uplink in consideration of a UL/DL data traffic ratio or an ultra-reliable low latency communication (URLLC) service.

At operation 1120, the base station may determine a new time advance (or additional time advance) value. For example, the base station may determine the new timing advance value using DL-to-UL/UL-to-DL switching time and $t_{ISD}$ information. Instead of $t_{ISD}$, $t_{P1}+t_{P2}$ or $2t_{P1}$ value can be used.

At operation 1130, the base station may determine whether allocation of an additional GP is necessary. The base station may determine whether the additional GP allocation is necessary based on whether all of the DL-to-UL/UL-to-DL switching time, $t_{ISD}$, and new (additional) time advance can be accommodated as the reference special subframe configuration. If it is determined that the additional GP allocation is not necessary, the base station proceeds to operation 1140, whereas if it is determined that the additional GP allocation is necessary, the base station proceeds to operation 1150.

At operation 1140, the base station can transmit a new (additional) time advance command DCI to the terminal.

At operation 1150, the base station may transmit the new (additional) time advance command DCI to the terminal through allocation of the additional GP or special subframe configuration having the additional GP. If the additional GP or the special subframe configuration having the additional GP has been pre-allocated, the GP allocation operation at operation 1150 can be omitted. The base station may determine allocation of the additional GP or the special subframe configuration having the additional GP by comparing the GP length allocated to the reference special subframe configuration with a required GP length. The base station may receive $t_{P2}$ (propagation delay value of the terminal belonging to an adjacent base station) transferred from the adjacent base station, and may determine a new time advance value based on $t_{P1}$ (propagation delay of the UE belonging to the corresponding base station) and the DL-to-UL/UL-to-DL switching time. As at least one of the plurality of parameters, an estimated value may be used, or a reference value may be used.

In case of pre-providing the configuration for the additional GP or the special subframe including the additional GP using the RRC message, allocation of the additional GP at operation 1130 may be omitted. In this case, at operation 1150, the additional TA information may be provided, and with respect to the additional GP, only information indicating whether to apply the same may be provided.

Figure 12:
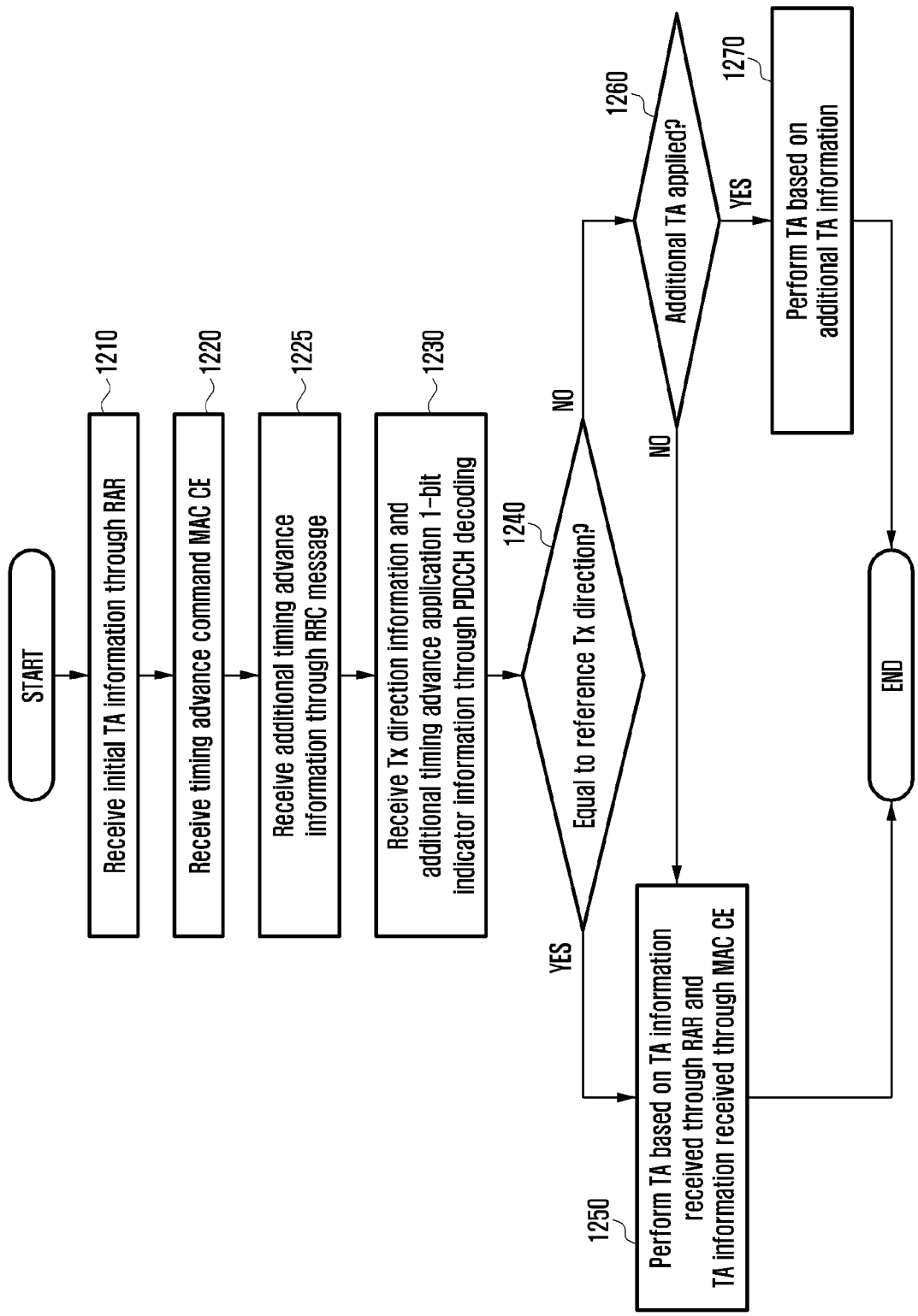
FIGS. 12, 13, 14, and 15 are diagrams illustrating the operation of a terminal according to an embodiment of the present disclosure.

FIG. 12 is a diagram illustrating the operation of a terminal according to an embodiment of the present disclosure.

Referring to FIG. 12, an embodiment of a terminal operation procedure for the technique (method 1) of performing timing alignment of a reception signal using an RRC message and DCI information is illustrated.

At operation 1210, a terminal may receive initial TA information from a base station through a RAR. The terminal may acquire the initial TA information based on a random access procedure. The terminal may receive an initial timing advance command from the base station through a MAC random access response (RAR).

At operation 1220, the terminal may receive TA information from the base station through the MAC CE. The TA information may be TAC information.

At operation 1225, the terminal may receive additional timing advance $t_I$ information from the base station through an RRC message. The operation 1225 may precede the operation 1220.

The timing advance command MAC CE configures a timing advance (TA) value in consideration of a case where all base stations have the same transmission direction, and the additional timing advance $t_{IA}$ information is configured in consideration of the timing adjustment between a desired signal and an interference signal when the base stations have different transmission directions in a dynamic TDD environment.

At operation 1225, the additional timing advance $t_{IA}$ transmitted through the RRC message may be transmitted through the MAC CE.

At operation 1230, the terminal decodes a PDCCH. The terminal may identify indication information for applying an additional timing advance (TA). The indication information may be a one-bit indicator.

At operation 1240, the terminal determines whether the transmission direction of the subframe/slot/TTI is equal to the reference transmission direction. For example, the terminal can identify whether the n-th subframe/slot/TTI configured as the downlink in accordance with the TDD configuration has been changed to the uplink in accordance with the dynamic TDD configuration.

If it is determined that the n-th subframe/slot/TTI is equal to the reference transmission direction, the terminal proceeds to operation 1250, whereas if it is determined that the n-th subframe/slot/TTI is different from the reference transmission direction, the terminal may proceed to operation 1260.

At operation 1250, the terminal performs the TA using the TA information received through the RAR and the TA information received through the MAC CE.

At operation 1230, if an indicator indicating whether to apply the additional TA is included, the terminal, at operation 1260, may identify the value of the one-bit information. For example, if the one-bit indicator is 0, the additional TA information may not be applied, whereas if the one-bit indicator is 1, the TA information may be applied. The one-bit indicator information may be analyzed to the contrary. Further, the size of the indicator is not limited to one bit.

At operation 1260, if it is determined that the additional TA information is not applied (e.g., if the indicator value is 0), the terminal proceeds to operation 1250 to perform the TA using the TA information received through the RAR and TAC information received through the MAC CE.

At operation 1270, the terminal may perform the TA using the additional TA information (e.g., additional TA ($t_{IA}$) information through the RRC message), the TA information received through the RAR, and the TA information using the TA information received through the MAC CE.

The terminal having performed the TA at operation 1250 or 1270 may transmit the uplink signal based on the TA performance.

Figure 13:
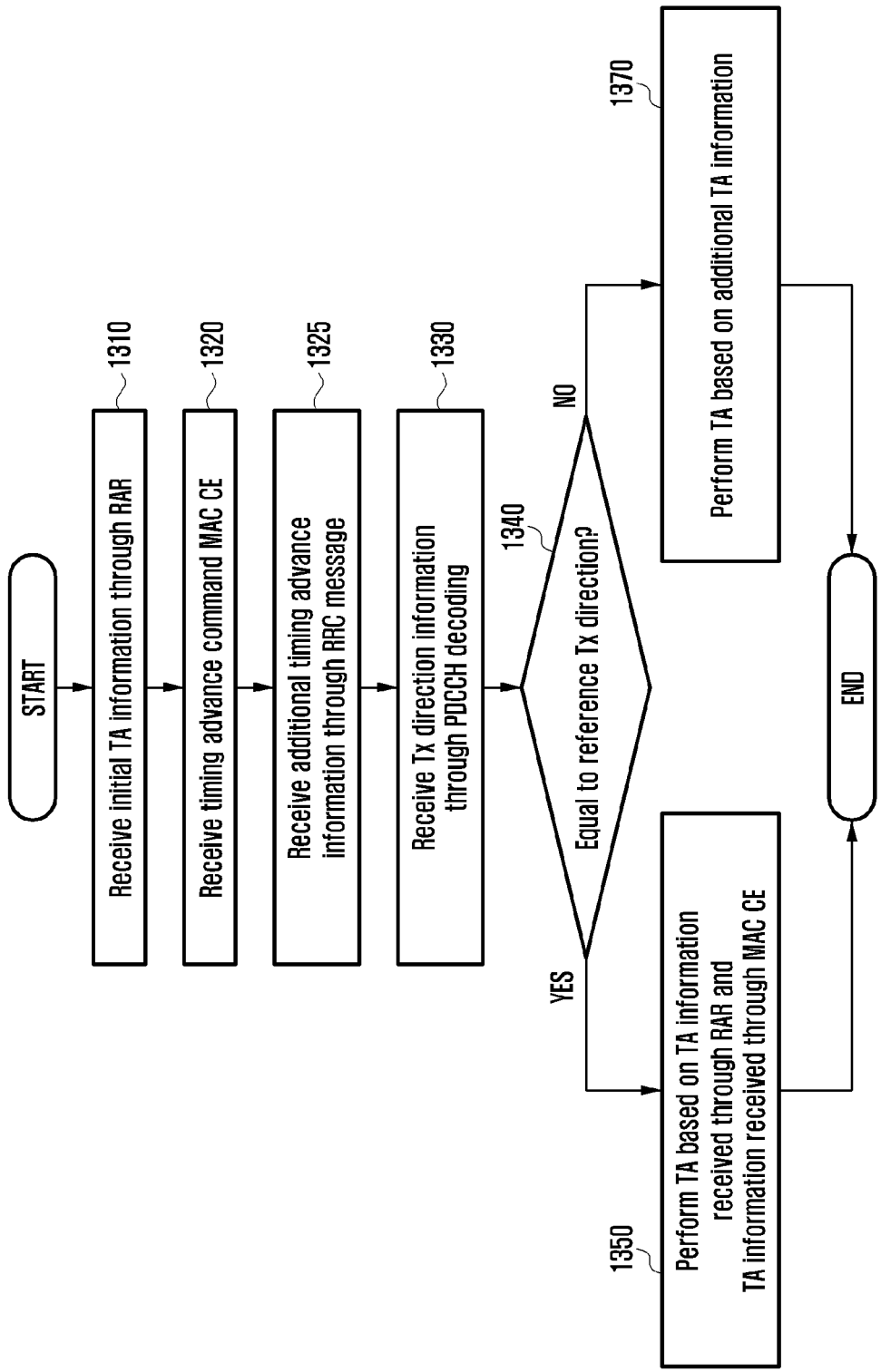

FIG. 13 is a diagram illustrating the operation of a terminal according to an embodiment of the present disclosure.

Referring to FIG. 13, an embodiment of a terminal operation procedure for the technique (method 2) of performing timing alignment of a reception signal using RRC and DCI information is illustrated.

At operation 1310, a terminal may receive initial TA information from a base station through a RAR. The terminal may acquire the initial TA information based on a random access procedure. The terminal may receive an initial timing advance command from the base station through a MAC random access response (RAR).

At operation 1320, the terminal may receive TA information from the base station through the MAC CE. The TA information may be TAC information.

At operation 1325, the terminal may receive additional timing advance $t_{IA}$ information from the base station through an RRC message. The operation 1325 may precede the operation 1320.

The timing advance command MAC CE configures a timing advance (TA) value in consideration of a case where all base stations have the same transmission direction, and the additional timing advance $t_{IA}$ information is configured in consideration of the timing adjustment between a desired signal and an interference signal when the base stations have different transmission directions in a dynamic TDD environment.

At operation 1325, the additional timing advance $t_{IA}$ transmitted through the RRC message may be transmitted through the MAC CE.

At operation 1330, the terminal decodes a PDCCH. The terminal may identify information on the transmission (Tx) direction through the PDCCH decoding. As compared with the embodiment of FIG. 12, the procedure of identifying the indication information for applying the additional timing advance (TA) is omitted.

At operation 1340, the terminal determines whether the transmission direction of the subframe/slot/TTI is equal to the reference transmission direction. For example, the terminal can identify whether the n-th subframe/slot/TTI configured as the downlink in accordance with the TDD configuration has been changed to the uplink in accordance with the dynamic TDD configuration.

If it is determined that the n-th subframe/slot/TTI is equal to the reference transmission direction, the terminal proceeds to operation 1350, whereas if it is determined that the n-th subframe/slot/TTI is different from the reference transmission direction, the terminal may proceed to operation 1370.

At operation 1350, the terminal performs the TA using the TA information received through the RAR and the TA information received through the MAC CE.

At operation 1370, the terminal may perform the TA using the additional TA information. The terminal may perform the TA using the additional TA information (e.g., additional TA ($t_{IA}$) information through the RRC message), the TA information received through the RAR, and the TA information received through the MAC CE.

The terminal having performed the TA at operation 1350 or 1370 may transmit the uplink signal based on the TA performance.

Figure 14:
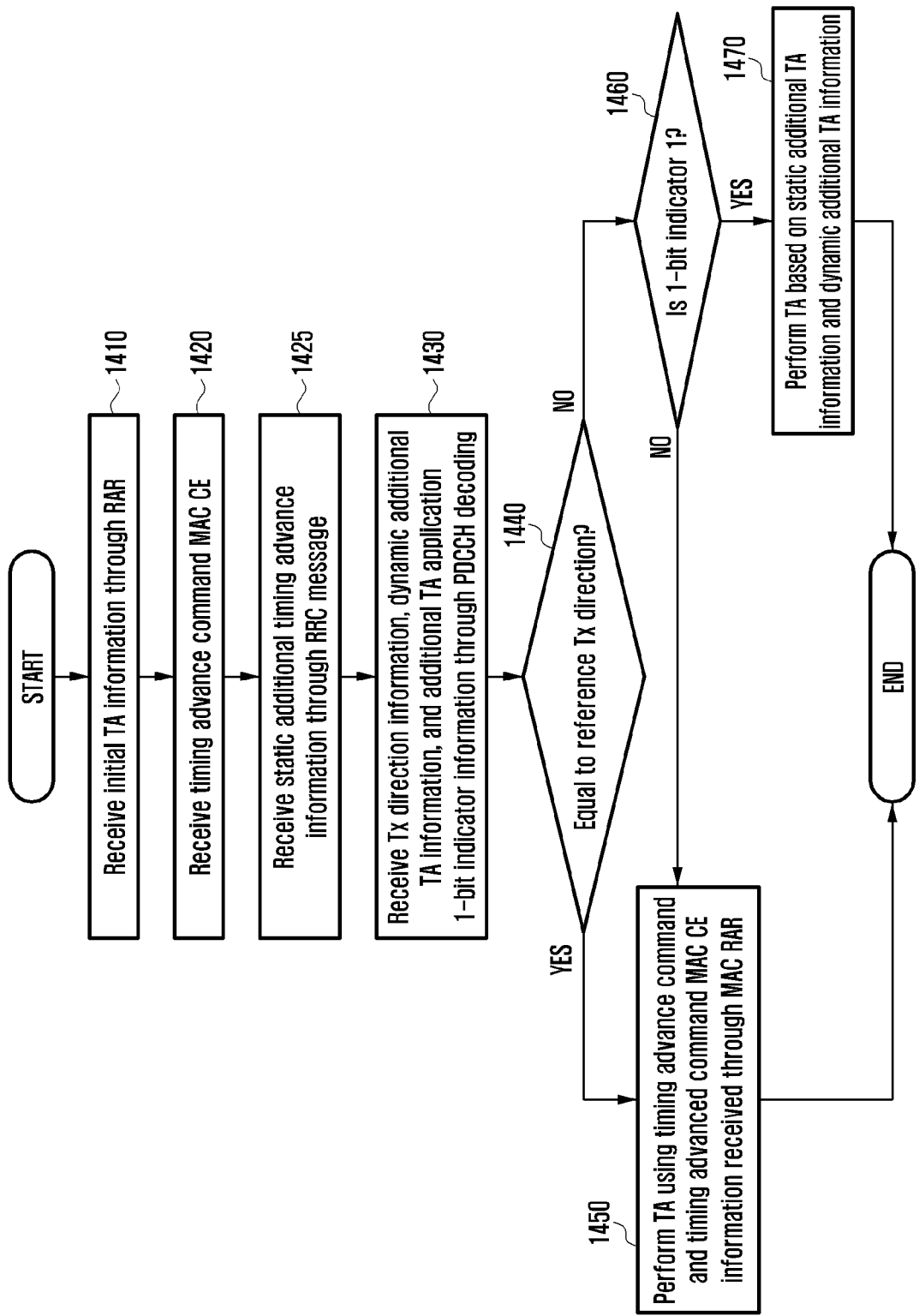

FIG. 14 is a diagram illustrating the operation of a terminal according to an embodiment of the present disclosure.

Referring to FIG. 14, an embodiment of a terminal operation procedure for the technique (method 3) of performing timing alignment of a reception signal using RRC and DCI information is illustrated.

At operation 1410, a terminal may receive initial TA information from a base station through a RAR. The terminal may acquire the initial TA information based on a random access procedure. The terminal may receive an initial timing advance command from the base station through a MAC random access response (RAR).

At operation 1420, the terminal may receive TA information from the base station through the MAC CE. The TA information may be TAC information.

At operation 1425, the terminal may receive static additional timing advance (TA) $t_{IA\_S}$ information from the base station through an RRC message. The operation 1425 may precede the operation 1420.

The timing advance command MAC CE configures a timing advance (TA) value in consideration of a case where all base stations have the same transmission direction, and the static additional timing advance $t_{IA\_S}$ information is configured in consideration of the timing adjustment between a desired signal and an interference signal when the base stations have different transmission directions in a dynamic TDD environment.

At operation 1425, the static additional timing advance (TA) $t_{IA\_S}$ information transmitted through the RRC message may be transmitted through the MAC CE.

At operation 1430, the terminal decodes a PDCCH. The terminal may identify information on the transmission (Tx) direction, dynamic additional TA information $t_{IA\_D}$, and indication information for applying an additional timing advance (TA) through the PDCCH decoding. The indication information may be one-bit indicator. The indicator may be information indicating static additional TA information and dynamic additional TA information.

At operation 1440, the terminal determines whether the transmission direction of the subframe/slot/TTI is equal to or different from the reference transmission direction. For example, the terminal can identify whether the n-th subframe/slot/TTI configured as the downlink in accordance with the TDD configuration has been changed to the uplink in accordance with the dynamic TDD configuration.

If it is determined that the n-th subframe/slot/TTI is equal to the reference transmission direction, the terminal proceeds to operation 1450, whereas if it is determined that the n-th subframe/slot/TTI is different from the reference transmission direction, the terminal may proceed to operation 1460.

At operation 1450, the terminal performs the TA using the TA information received through the RAR and the TA information received through the MAC CE.

If the indicator indicating whether to apply the additional TA is included at operation 1430, the terminal, at operation 1460, may identify the value of the one-bit information. For example, if the one-bit indicator is 0, the additional TA information is not applied, whereas if the one-bit indicator is 1, the TA information can be applied. The one-bit indicator information may be analyzed to the contrary. Further, the size of the indicator is not limited to one bit.

At operation 1460, if it is determined that the additional TA information is not applied (e.g., if the indicator value is 0), the terminal proceeds to operation 1450 to perform the TA using the TA information received through the RAR and TAC information received through the MAC CE. If it is determined that the additional TA information is applied (e.g., if the indicator value is 1), the terminal proceeds to operation 1470 to perform the TA using the additional TA information (static additional TA information and dynamic additional TA information).

At operation 1470, the terminal may perform the TA using the additional TA information (e.g., static TA ($t_{IA\_S}$) information received through the RRC message and dynamic TA (($t_{IA\_D}$) information received through the DCI), the TA information received through the RAR, and the TA information received through the MAC CE.

The terminal having performed the TA at operation 1450 or 1470 may transmit the uplink signal based on the TA performance.

Figure 15:
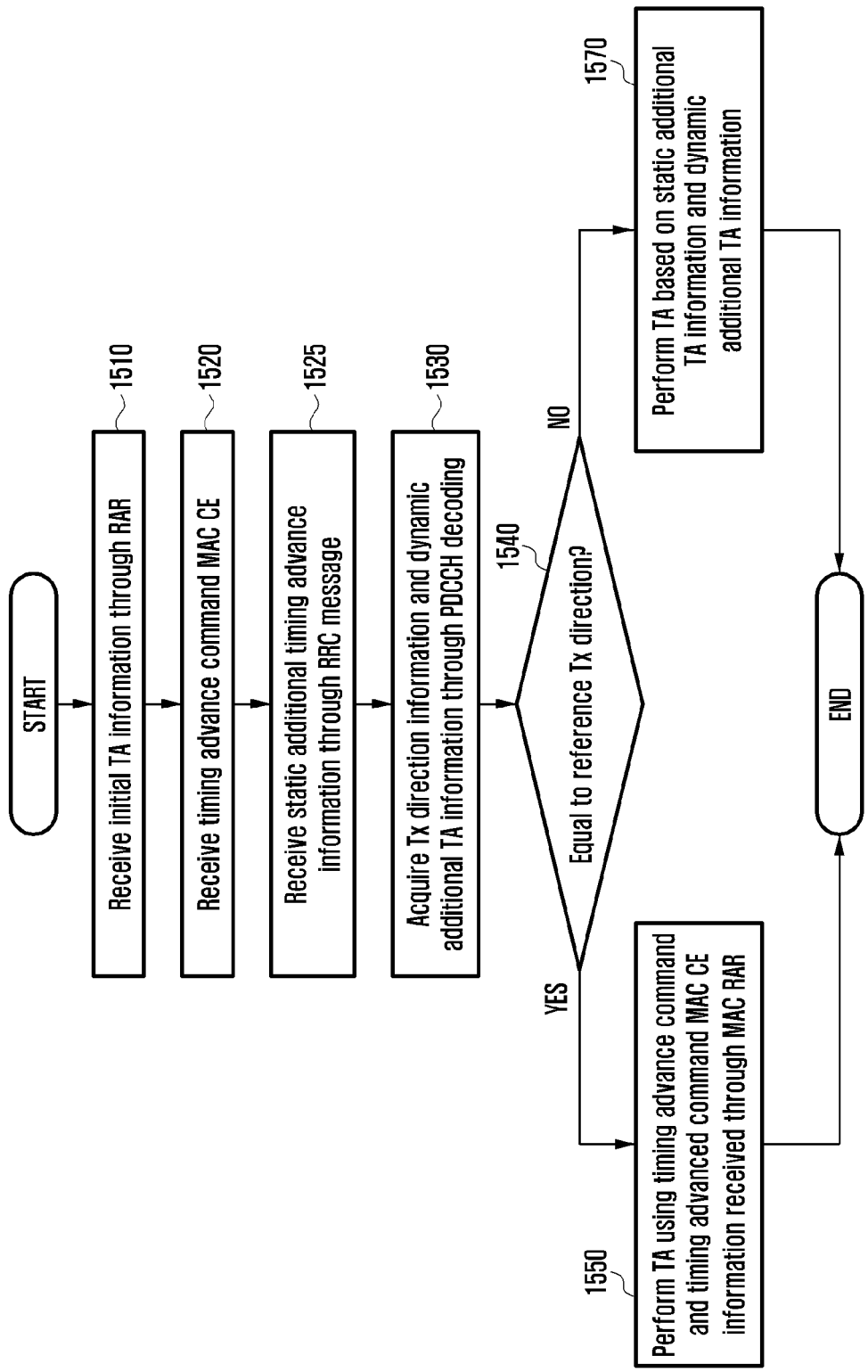

FIG. 15 is a diagram illustrating the operation of a terminal according to an embodiment of the present disclosure.

Referring to FIG. 15, an embodiment of a terminal operation procedure for the technique (method 4) of performing timing alignment of a reception signal using RRC and DCI information is illustrated.

At operation 1510, a terminal may receive initial TA information from a base station through a RAR. The terminal may acquire the initial TA information based on a random access procedure. The terminal may receive an initial timing advance command from the base station through a MAC random access response (RAR).

At operation 1520, the terminal may receive TA information from the base station through the MAC CE. The TA information may be TAC information.

At operation 1525, the terminal may receive static additional timing advance (TA) $t_{IA\_S}$ information from the base station through an RRC message. The operation 1525 may precede the operation 1520.

The timing advance command MAC CE configures a timing advance (TA) value in consideration of a case where all base stations have the same transmission direction, and the static additional timing advance $t_{IA\_S}$ information is configured in consideration of the timing adjustment between a desired signal and an interference signal when the base stations have different transmission directions in a dynamic TDD environment.

At operation 1525, the static additional timing advance (TA) $t_{IA\_S}$ information transmitted through the RRC message may be transmitted through the MAC CE.

At operation 1530, the terminal decodes a PDCCH. The terminal may identify information on the transmission (Tx) direction and dynamic additional TA information $t_{IA\_D}$. As compared with FIG. 14, indication information for applying the additional timing advance (TA) may be omitted.

At operation 1540, the terminal determines whether the transmission direction of the subframe/slot/TTI is equal to or different from the reference transmission direction. For example, the terminal can identify whether the n-th subframe/slot/TTI configured as the downlink in accordance with the TDD configuration has been changed to the uplink in accordance with the dynamic TDD configuration.

If it is determined that the n-th subframe/slot/TTI is equal to the reference transmission direction, the terminal proceeds to operation 1550, whereas if it is determined that the n-th subframe/slot/TTI is different from the reference transmission direction, the terminal may proceed to operation 1570.

At operation 1550, the terminal performs the TA using the TA information received through the RAR and the TA information received through the MAC CE.

If it is determined that the additional TA information is applied, the terminal may proceed to operation 1570 to perform the TA using the additional TA information (static additional TA information and dynamic additional TA information).

At operation 1570, the terminal may perform the TA using the additional TA information (e.g., static TA ($t_{IA\_S}$) information received through the RRC message, dynamic TA ($(t_{IA\_D})$) information received through the DCI), the TA information received through the RAR, and the TA information received through the MAC CE.

The terminal having performed the TA at operation 1550 or 1570 may transmit the uplink signal based on the TA performance.

Figure 16:
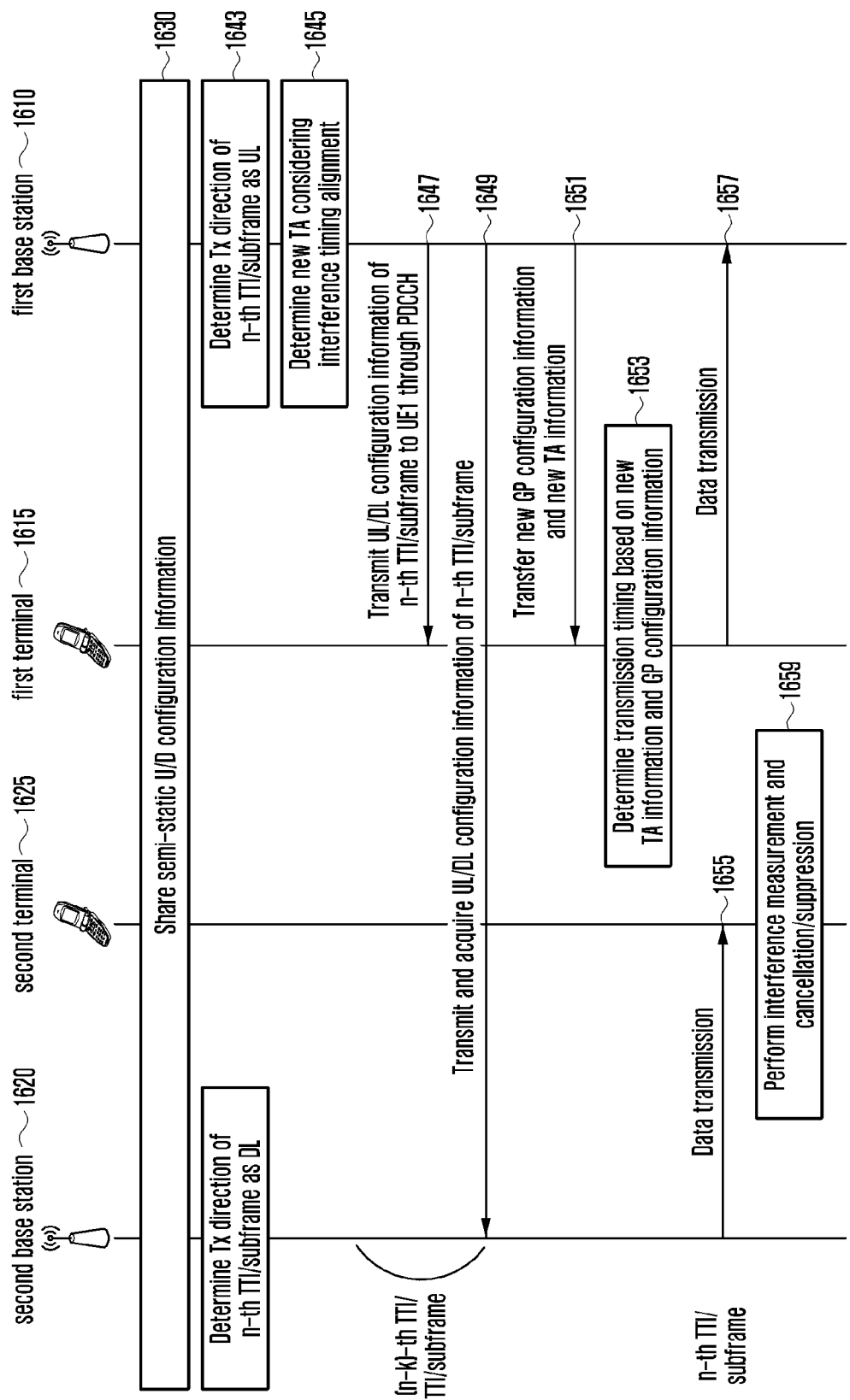
FIG. 16 is a diagram illustrating the operations of respective entities in a system including a terminal and a base station according to an embodiment of the present disclosure.

FIG. 16 is a diagram illustrating the operations of respective entities in a system including a terminal and a base station according to an embodiment of the present disclosure.

Referring to FIG. 16, a wireless communication system may include a first base station 1610, a second base station 1620, a first terminal 1615, and a second terminal 1625. A serving base station of the first terminal 1615 is the first base station 1610, and a serving base station of the second terminal 1625 is the second base station 1620.

At operation 1630, semi-static UL/DL configuration information may be shared among the base stations. Information exchange between the base stations may be performed using an X2 interface. This information may be shared even between terminals (first terminal and second terminal) using an RRC message. The transmission direction of a subframe/slot/TTI according to TDD configuration information shared at operation 1630 may be a reference direction.

At operations 1641 and 1643, the base stations may determine whether the n-th TTI/slot/subframe maintains or changes the direction that is the original reference direction in consideration of the UL/DL traffic load ratio or the kind of supporting services. In an embodiment of the present disclosure, it is assumed that the reference direction of the n-th TTI/slot/subframe corresponds to a downlink. It is assumed that the second base station 1620 maintains the direction of the n-th TTI/slot/subframe as the direction of a downlink that is the reference transmission direction (operation 1641), and the first base station 1610 determines to change the direction of the n-th TTI/slot/subframe to the direction of an uplink that is different from the reference direction (operation 1643).

At operation 1645, the first base station 1610 determines at least one of an additional GP and an additional timing alignment value in consideration of an interference timing alignment.

At operation 1647, the first base station 1610 transmits UL/DL information of the n-th TTI/slot/subframe to the first terminal 1615 through a PDCCH. The first terminal 1615 may identify whether the n-th TTO/slot/subframe is an uplink or a downlink.

At operation 1649, the second base station 1620 may hear this information through overhearing, and may acquire UL/DL configuration information of the n-th TTI/slot/subframe of the first base station 1610 using other resources.

At operation 1651, the first base station 1610 may transfer the additional GP, the special subframe configuration information including the additional GP, and the additional TA information to the first terminal 1615. In addition, the first base station 1610 may transfer indication information indicating whether to apply the additional TA information to the first terminal 1615. As methods for transferring the respective information, the methods as described above according to the previous embodiments are referred to.

At operation 1653, the first terminal 1615 may determine new transmission timing based on the received additional timing advance information, additional GP, or special subframe configuration information including the additional GP.

In the n-th subframe, the second base station 1620 transmits downlink data to the second terminal 1625 (operation 1655). In the n-th subframe, the first terminal 1615 transmits uplink data to the first base station 1610 (operation 1657). The first terminal 1615 may transmit the uplink data based on the uplink transmission timing adjusted using at least one of the additional GP and additional timing advance information.

From the standpoint of the second terminal 1625, a desired signal is downlink data transmitted by the second base station 1620, and the uplink signal that the first terminal 1615 transmits to the first base station 1610 becomes an interference with respect to the second terminal 1625. At operation 1659, the second terminal 1625 may perform interference measurement and interference cancellation/suppression using the desired signal from the second base station 1620 and the interference signal coming from the first terminal 1615 in the aligned timing.

In the above-described method, with respect to the reference direction, the first base station 1610 having changed the direction of the n-th TTI/slot/subframe may provide additional GP information and additional TA information to the first terminal 1615 serviced by the first base station itself, and the first terminal 1615 may adjust the uplink transmission timing based on the additional TA information and additional GP information received from the first base station 1610. In this case, since the timing of the interference signal transmitted by the first terminal 1615 has been adjusted, the second terminal 1625 can efficiently perform the interference measurement, suppression, and cancellation. Through this, an interference problem occurring when a dynamic TDD system changes the n-th slot/TTI/subframe from the downlink to the uplink can be efficiently managed.

Figure 17:
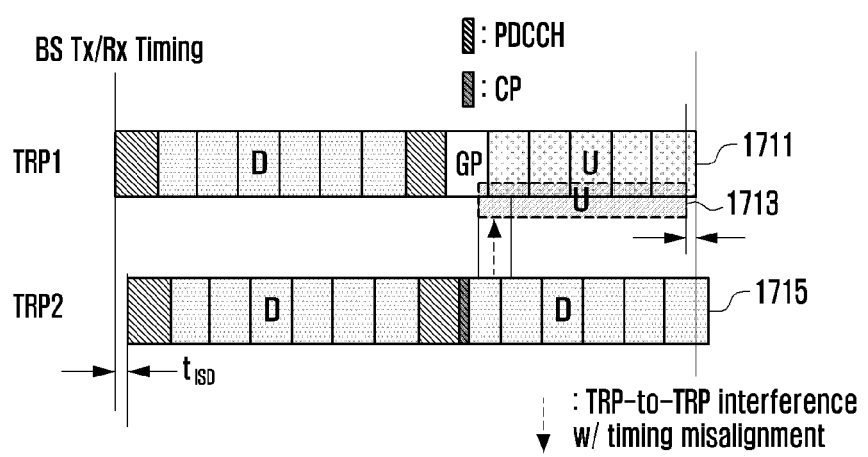
FIGS. 17, 18A and 18B, and 19A and 19B are diagrams illustrating timing misalignment and a process of solving the same according to an embodiment of the present disclosure.
Figure 18A:
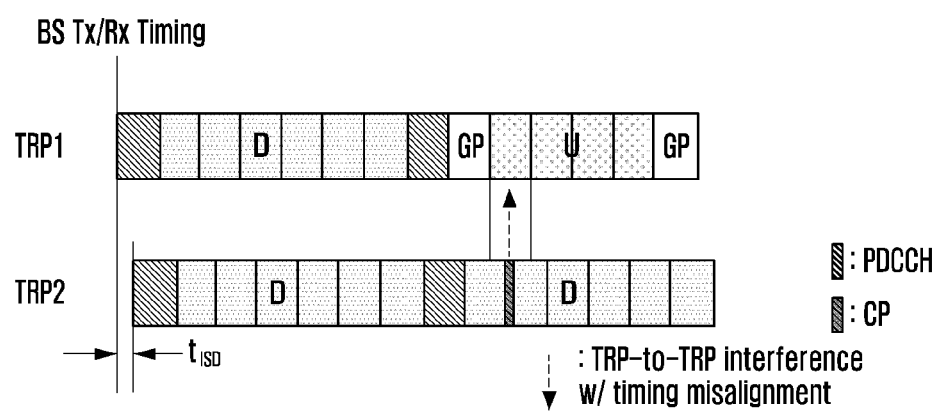
Figure 18B:
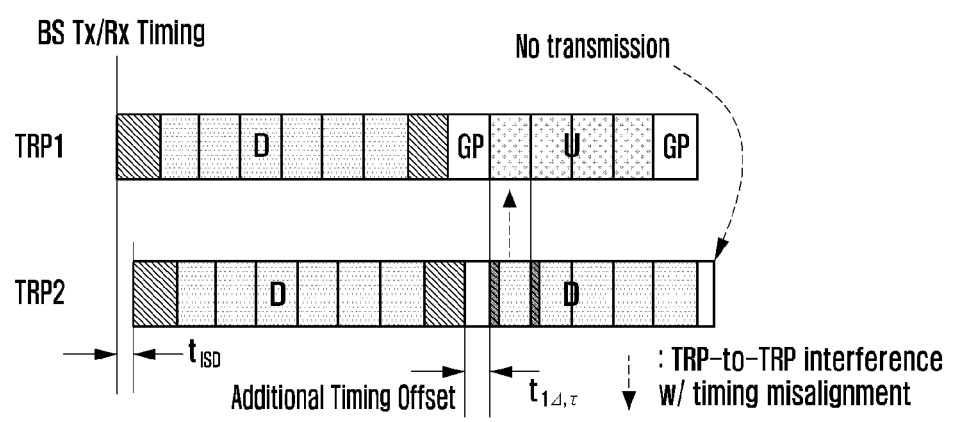

With reference to FIGS. 17, 18A, and 18B, it is intended to solve a problem caused by an interference between an uplink received by a base station and a downlink signal transmitted by another base station. Since CPs of a desired signal and an interference signal do not overlap each other, interference measurement, cancellation, and suppression may be the same issue even in this embodiment of the present disclosure, and thus the concept according to the embodiments as described above can be equally applied to this embodiment.

FIG. 17 is a diagram illustrating timing misalignment and a process of solving the same according to an embodiment of the present disclosure.

Referring to FIG. 17, an embodiment of a technique for reception signal timing adjustment between a TRP-to-TRP interference and a desired signal in a case where a downlink corresponding to a reference transmission direction is changed to an uplink is illustrated.

The drawing reference numeral "1711" denotes timing of TRP 1, and "1713" denotes timing of TRP 2. The drawing reference numeral "1712" indicates that downlink data transmitted by TRP 2 acts as an interference with respect to TRP 1.

If a TA is normally performed, a UL UE signal is advanced as much as $t_{UL-DL}$ in the BS Tx/Rx timing, and is received by TRP 1. A DL signal transmitted by TRP2 that is an adjacent base station is delayed as much as $t_{ISD}$, and is received by TRP 1. In considering this point, when the dynamic TDD system performs an additional TA for timing adjustment between the desired signal and UE-to-UE interference, additional timing advance is configured to satisfy [(condition 4 or condition 5) and condition 6]. The conditions 4, 5, and 6 are as follows.

$$\mathrm{mod}(t_{ISD}+t_{UL-DL}+t_{IA},T_{OFDM}) \geq T_{OFDM}-(T_{CP}-t_W) \quad \text{[Condition 4]}$$

$$\mathrm{mod}(t_{ISD}+t_{UL-DL}t_{IA},T_{OFDM}) \leq (T_{CP}-t_W) \quad \text{[Condition 5]}$$

$$t_{IA} \leq GP-(t_{UL-DL}+2t_{P1}) \quad \text{[Condition 6]}$$

In case of changing DL that is a reference transmission direction to UL, a TRP-to-TRP interference and a UE-to-UE interference may simultaneously occur, or only one of the interferences may occur. If only the UE-to-UE interference occurs, $t_{IA}$ may be determined using conditions 1 to 3 and conditions 1-1 to 3-1, and if only the TRP-to-TRP interference occurs, $t_{IA}$ may be determined using conditions 4 to 6. if two interferences simultaneously exist, conditions 1 to 6 may be considered. On the other hand, $t_{IA}$ that satisfies both the two conditions may not exist. In this case, an intermediate value of extreme values satisfying the respective conditions may be used.

If a CP component $t_W$ that is helpful for the window is not considered, conditions 4 and 5 may be expressed as conditions 4-1 and 5-1 as below.

$$\mathrm{mod}(t_{ISD}+t_{UL-DL}+t_{IA},T_{OFDM}) \geq T_{OFDM}-T_{CP} \quad \text{[Condition 4-4]}$$

$$\mathrm{mod}(t_{ISD}+t_{UL-DL}+t_{IA},T_{OFDM}) \leq T_{CP} \quad \text{[Condition 5-1]}$$

FIGS. 18A and 18B are diagrams illustrating timing misalignment and a process of solving the same according to an embodiment of the present disclosure.

Referring to FIGS. 18A and 18B, an embodiment of a technique for reception signal timing adjustment between a TRP-to-TRP interference and an uplink desired signal in a case where an uplink corresponding to a reference transmission direction is changed to a downlink is illustrated. In this embodiment, timing adjustment between reception signals is performed by allocating an additional timing offset to the transmission signal of the base station that changes the transmission direction.

As shown in FIG. 18B, the additional timing offset may be allocated to the remaining portion excluding a control region commonly allocated, that is, a data portion. In this case, transmission of the last OFDM symbol of a TTI/slot/subframe may cause an unexpected interference to occur, and if there is no special adjustment, data is not transmitted through the last OFDM symbol. When the dynamic TDD system allocates an additional timing offset for timing adjustment between the desired uplink signal and TRP-to-TRP interference, an additional timing offset $t_{IA,2}$ is configured to satisfy [condition 7 or condition 8]. The conditions 7 and 8 are as follows.

$$\mathrm{mod}(t_{ISD}+t_{UL-DL}+t_{IA,2},T_{OFDM}) \geq T_{OFDM}-(T_{CP}-t_W) \quad \text{[Condition 7]}$$

$$\mathrm{mod}(t_{ISD}+t_{UL-DL}+t_{IA,2},T_{OFDM}) \leq (T_{CP}-t_W) \quad \text{[Condition 8]}$$

If a CP component $t_W$ that is helpful for the window is not considered, conditions 7 and 8 may be expressed as conditions 7-1 and 8-1 as below.

$$\mathrm{mod}(t_{ISD}+t_{UL-DL}+t_{IA,2},T_{OFDM}) \geq T_{OFDM}-T_{CP} \quad \text{[Condition 7-1]}$$

$$\mathrm{mod}(t_{ISD}+t_{UL-DL}+t_{IA,2},T_{OFDM}) \leq T_{CP} \quad \text{[Condition 8-1]}$$

19A and 19B are diagrams illustrating timing misalignment and a process of solving the same according to an embodiment of the present disclosure.

Figure 19A:
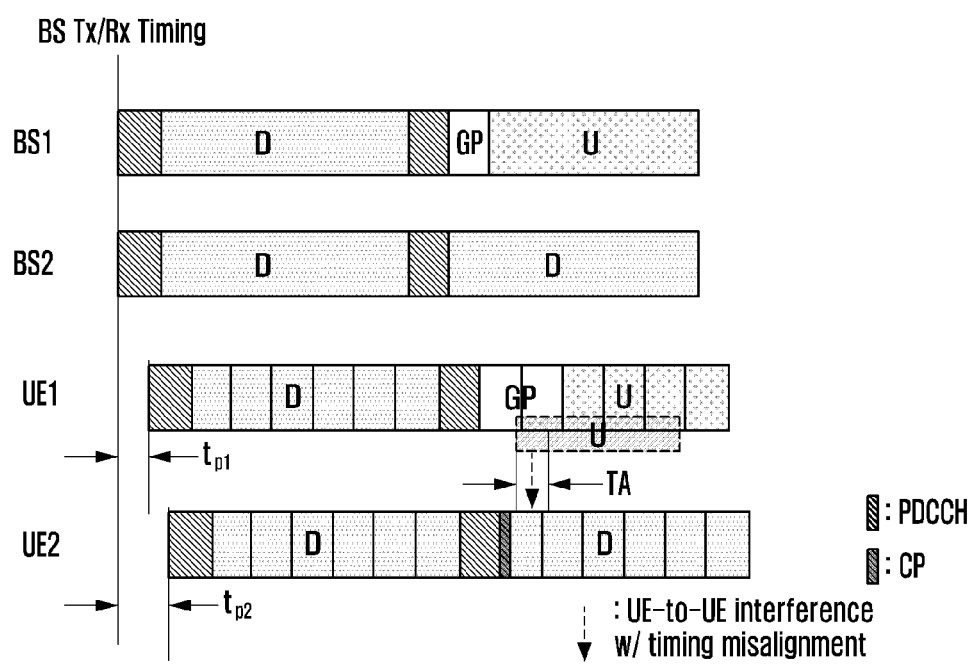
Figure 19B:
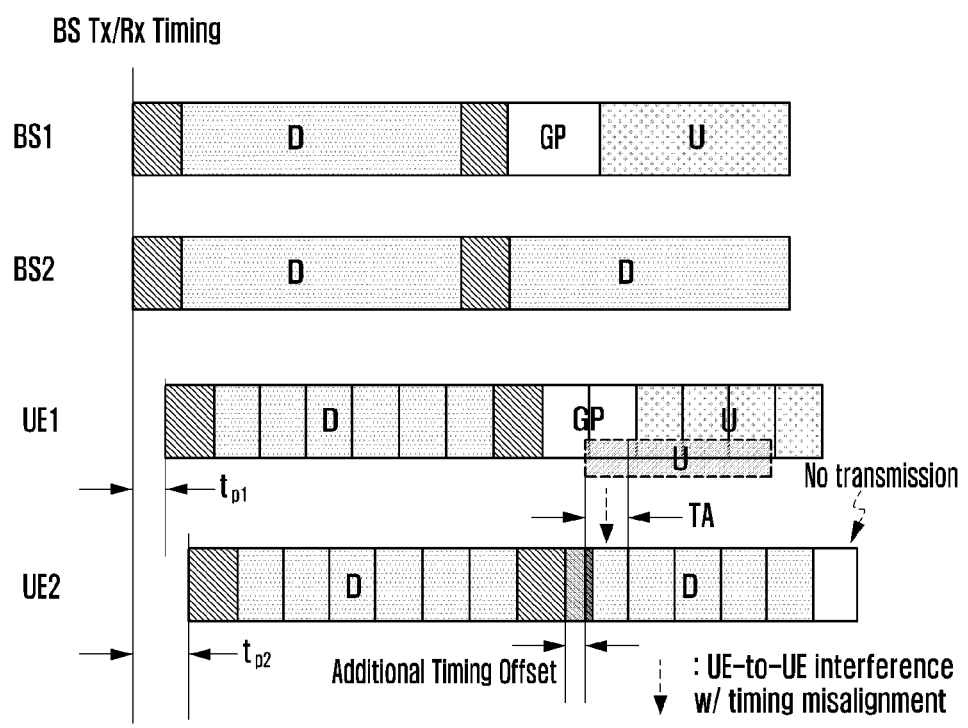

Referring to FIGS. 19A and 19B, an embodiment of a technique for reception signal timing adjustment between a UE-to-UE interference and a desired uplink signal in a case where an uplink corresponding to a reference transmission direction is changed to a downlink is illustrated. When the dynamic TDD system performs an additional offset for a downlink signal of a base station that changes the uplink to the downlink for the timing adjustment between the desired UL signal and UE-to-UE interference, an additional timing offset $t_{IA,2}$ is configured to satisfy [condition 9 or condition 10]. The conditions 9 and 10 are as follows.

$$\mathrm{mod}(t_{p1}+t_{p2}+t_{UL-DL}+t_{IA,2},T_{OFDM}) \geq T_{OFDM}-(T_{CP}-t_W) \quad \text{[Condition 9]}$$

$$\mathrm{mod}(t_{p1}+t_{p2}+t_{UL-DL}+t_{IA,2},T_{OFDM}) \leq (T_{CP}-t_W) \quad \text{[Condition 10]}$$

On condition 9 and condition 10, in order to obtain a propagation delay value $t_{P2}$ for a downlink terminal of an adjacent base station, delay occurs, and for $t_{P1}+t_{P2}$, the $t_{ISD}$ or $t_{P2}$ value may be replaced by $t_{ISD}/2$. In the case where $t_{P1}+t_{P2}$ is replaced by $t_{ISD}$, the condition 9 and condition 10 can be expressed as follows.

$$\mathrm{mod}(t_{ISD}+t_{UL-DL}+t_{IA,2},T_{OFDM}) \geq T_{OFDM}-(T_{CP}-t_W) \quad \text{[Condition 9-1]}$$

$$\mathrm{mod}(t_{ISD}+t_{UL-DL}+t_{IA,2},T_{OFDM}) \leq (T_{CP}-t_W) \quad \text{[Condition 10-1]}$$

If a CP component $t_W$ that is helpful for the window is not considered, conditions 9 and 10 may be expressed as follows.

$$\mathrm{mod}(t_{p1}+t_{p2}+t_{UL-DL}+t_{IA,2},T_{OFDM}) \geq T_{OFDM}-T_{CP} \quad \text{[Condition 9-2]}$$

$$\mathrm{mod}(t_{p1}+t_{p2}+t_{UL-DL}+t_{IA,2},T_{OFDM}) \leq T_{CP} \quad \text{[Condition 10-2]}$$

In case of changing the uplink that is the reference transmission direction to the downlink, in the same manner as the case where the downlink that is the reference transmission direction to the uplink, the TRP-to-TRP interference and the UE-to-UE interference may simultaneously occur, or only one of the interferences may occur. If only the UE-to-UE interference occurs, $t_{IA}$ may be determined using conditions 9, 10, 9-1, and 10-1, and if only the TRP-to-TRP interference occurs, $t_{TA}$ may be determined using conditions 7, 8, 7-1, and 8-1. If the two interferences simultaneously exist, conditions 7, 8, 9-1, and 10-1 may be used. Further, conditions 7, 8, 9, and 10 may be used, or conditions 7-1, 8-1, 9-2, and 10-2 may be used. On the other hand, $t_{TA}$ that satisfies both the two conditions may not exist. In this case, an intermediate value of extreme values satisfying the respective conditions may be used.

Figure 20:
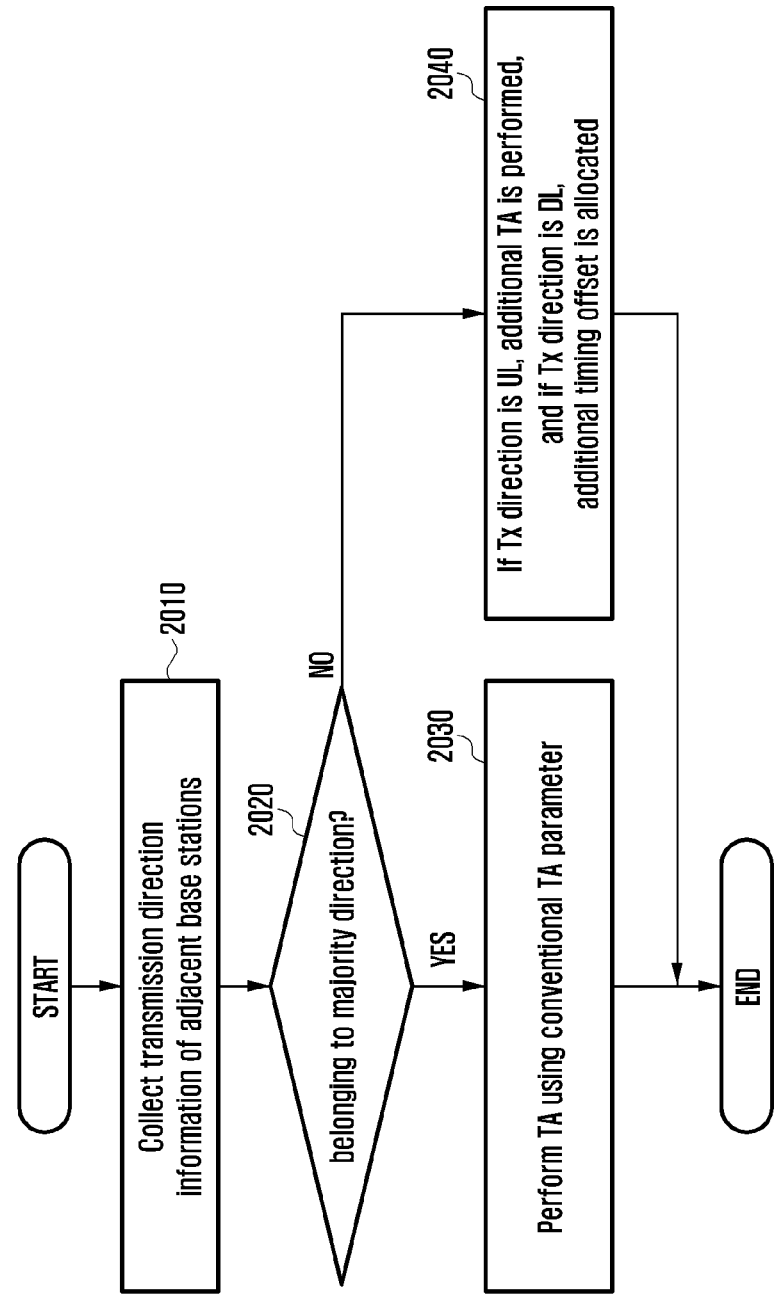
FIG. 20 is a diagram illustrating the operation of a base station according to an embodiment of the present disclosure.

FIG. 20 is a diagram illustrating the operation of a base station according to an embodiment of the present disclosure.

Referring to FIG. 20, an embodiment of a procedure of performing timing adjustment between a desired signal and an interference in case where each cell dynamically changes the transmission direction of each slot/TTI/subframe without the reference transmission direction is illustrated.

At operation 2010, a base station receives information on the transmission directions of adjacent base stations. The base station acquires transmission direction information of the respective cells forming a cell cluster.

At operation 2020, the base station determines the transmission direction in which the majority belong based on the transmission direction information of the respective cells forming the cell cluster. If the transmission direction of the base station itself is equal to the transmission direction of the plural base stations in the cluster, the base station proceeds to operation 2030, whereas if the transmission direction of the base station is not equal to the transmission direction of the plural base stations, the base station proceeds to operation 2040. The majority and minority are determined by the transmission directions of the cells, and if a larger number of cells having downlink transmission direction exist, the downlink cell becomes the majority, and the UL cell becomes the minority.

At operation 2030, since the base station belongs to the majority, the TA may be performed using the conventional TA parameters.

At operation 2040, the base station performs an additional TA or allocates the timing offset in a cell having the minority transmission direction. If the transmission direction corresponds to the uplink, the base station performs an additional TA, whereas if the transmission direction corresponds to the downlink, the base station may apply an additional timing offset.

Figure 21:
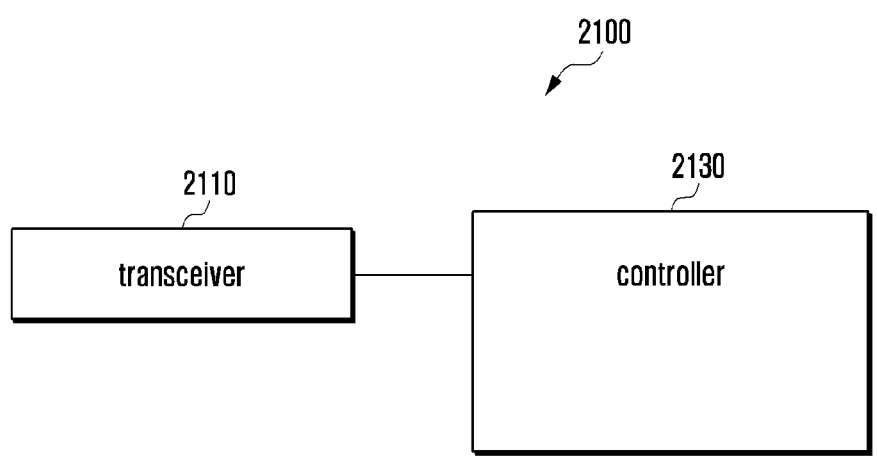
FIG. 21 is a diagram illustrating a terminal according to an embodiment of the present disclosure.

FIG. 21 is a diagram illustrating a terminal according to an embodiment of the present disclosure.

Referring to FIG. 21, a terminal 2100 may include a transceiver 2110 and a controller 2130. The transceiver 2110 may transmit and/or receive signals. The transceiver 2110 may be called a communication unit. The controller 2130 may control the overall operation of the terminal 2100. The controller 2130 may include at least one processor.

According to an embodiment of the present disclosure, the at least one processor may be configured to receive timing advance (TA) information related to an interference, to determine whether to apply the TA information related to the interference, and to transmit uplink data based on the TA information related to the interference. The TA information related to the interference may be received through downlink control information (DCI). Whether to apply the TA information related to the interference may be determined based on at least one of indication information indicating whether a direction of a slot for transmitting the uplink data is equal to a reference transmission direction and indication information indicating whether to apply the TA information related to the interference. The TA information related to the interference may be determined so that a cyclic prefix (CP) for the uplink data and a CP of another terminal receiving the uplink data as the interference overlap each other in consideration of a switching time and a propagation delay.

Further, according to an embodiment of the present disclosure, the at least one processor may be configured to receive static TA information among the TA information related to the interference through a radio resource control (RRC) message, and to receive dynamic TA information through a DCI.

Further, according to an embodiment of the present disclosure, the at least one processor may be configured to control reception of an additional guard period (GP) related to the interference or special subframe configuration information including the additional GP.

The configuration and the operation of the terminal 2100 are not limited to those of the embodiment of FIG. 21, and may include the operation and the configuration of the terminal as described above through FIGS. 1 to 20 according to the present disclosure. The controller 2130 of the terminal 2100 may control the operation of the terminal as described above with reference to FIGS. 1 to 20.

Figure 22:
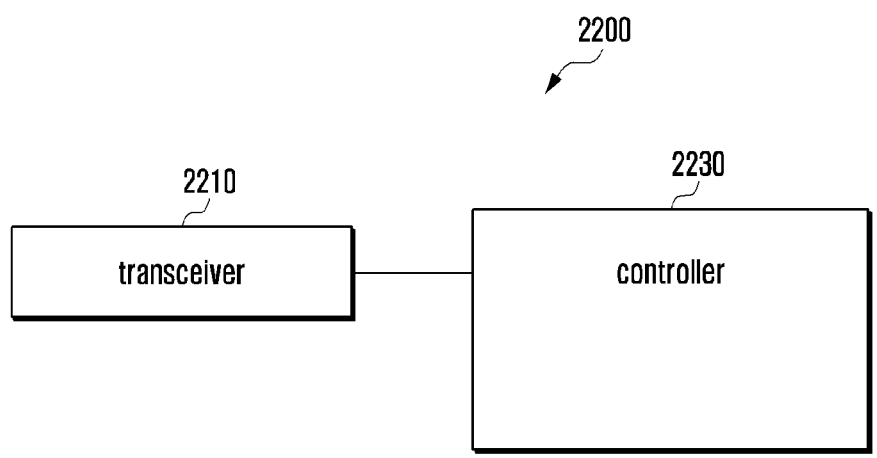
FIG. 22 is a diagram illustrating a base station according to an embodiment of the present disclosure.

FIG. 22 is a diagram illustrating a base station according to an embodiment of the present disclosure.

Referring to FIG. 22, a base station 2200 may include a transceiver 2210 and a controller 2230. The transceiver 2210 may transmit and/or receive signals. The transceiver 2210 may be called a communication unit. The controller 2230 may control the overall operation of the base station 2200. The controller 2230 may include at least one processor.

According to an embodiment of the present disclosure, the at least one processor may be configured to determine a direction of an n-th slot to be different from a reference transmission direction, to determine TA information related to an interference to be applied to the n-th slot, to transmit the TA information related to the interference to a terminal, and to receive from the terminal uplink data whose timing is adjusted based on the TA information related to the interference. Among the TA information related to the interference, static TA information may be transmitted through a radio resource control (RRC) message, and dynamic TA information is transmitted through a DCI.

Further, according to an embodiment of the present disclosure, the at least one processor may be configured to transmit downlink control information (DCI) including the TA information related to the interference is transmitted.

Further, according to an embodiment of the present disclosure, the at least one processor may be configured to transmit indication information indicating whether to apply the TA information related to the interference.

Further, according to an embodiment of the present disclosure, the at least one processor may be configured to control transmission of an additional guard period (GP) related to the interference or special subframe configuration information including the additional GP.

Further, according to an embodiment of the present disclosure, the at least one processor may be configured to determine the TA information related to the interference so that a cyclic prefix (CP) for the uplink data and a CP of another terminal receiving the uplink data as the interference overlap each other in consideration of a switching time and a propagation delay.

The configuration and the operation of the base station 2200 are not limited to those of the embodiment of FIG. 22, and may include the operation and the configuration of the terminal as described above through FIGS. 1 to 20 according to the present disclosure. The controller 2230 of the base station 2200 may control the operation of the base station as described above with reference to FIGS. 1 to 20.

Although embodiments of the present disclosure have been described in the specification and drawings and specific wordings have been used, these are merely used as general meanings to help understanding of the present disclosure, and do not limit the scope of the present disclosure. It should be construed that all changes or modifications derived based on the technical concept of the present disclosure are included in the scope of the present disclosure in addition to the embodiments disclosed herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal, the method comprising:
    receiving, from a base station, timing advance (TA) information related to an interference;
    identifying whether a slot is switched from a downlink slot to an uplink slot based on a dynamic TDD configuration;
    applying the TA information related to the interference to the slot in case that the slot is switched from the downlink slot to the uplink slot so that a cyclic prefix (CP) associated with an uplink symbol of the slot for the terminal overlaps with a CP associated with a downlink symbol of another terminal based on a timing adjustment according to the TA information related to the interference; and
    transmitting, to the base station, uplink data based on the timing adjustment according to the TA information related to the interference,
    wherein the uplink data is an interference signal to the another terminal.

2. The method of claim 1, wherein the TA information related to the interference is received through downlink control information (DCI).

3. The method of claim 1, further comprising:
    determining whether to apply the TA information related to the interference to the slot based on indication information indicating whether to apply the TA information related to the interference.

4. The method of claim 1, wherein:
    the TA information related to the interference comprises static TA information received through a radio resource control (RRC) message and dynamic TA information received through DCI, and
    the TA information related to the interference is determined based on a switching time and a propagation delay.

5. The method of claim 1, further comprising receiving downlink control information (DCI) including an additional guard period (GP) related to the interference,
    wherein the additional GP is different from a default GP.

6. A terminal comprising:
    a transceiver; and
    a processor configured to:
        receive, from a base station via the transceiver, timing advance (TA) information related to an interference,
        identify whether a slot is switched from a downlink slot to an uplink slot based on a dynamic TDD configuration,
        apply the TA information related to the interference to the slot in case that the slot is switched from the downlink slot to the uplink slot so that a cyclic prefix (CP) associated with an uplink symbol of the slot for the terminal overlaps with a CP associated with a downlink symbol of another terminal based on a timing adjustment according to the TA information related to the interference, and
        transmit, to the base station via the transceiver, uplink data based on the timing adjustment according to the TA information related to the interference,
    wherein the uplink data is an interference signal to the another terminal.

7. The terminal of claim 6, wherein the TA information related to the interference is received through downlink control information (DCI).

8. The terminal of claim 6, wherein the processor is further configured to determine whether to apply the TA information related to the interference to the slot based on indication information indicating whether to apply the TA information related to the interference.

9. The terminal of claim 6, wherein:
    the TA information related to the interference comprises static TA information received through a radio resource control (RRC) message and dynamic TA information received through DCI, and
    the TA information related to the interference is determined based on a switching time and a propagation delay.

10. The terminal of claim 6, wherein the processor is configured to receive downlink control information (DCI) including an additional guard period (GP) related to the interference, and
    wherein the additional GP is different from a default GP.

11. A method performed by a base station, the method comprising:
    determining timing advance (TA) information related to an interference;
    transmitting the TA information related to the interference to a terminal; and
    receiving, from the terminal, uplink data on a slot based on a timing adjustment according to the TA information related to the interference,
    wherein the TA information related to the interference is applied to the slot in case that the slot is switched from a downlink slot to an uplink slot so that a cyclic prefix (CP) associated with an uplink symbol of the terminal overlaps with a CP associated with a downlink symbol of another terminal based on the timing adjustment according to the TA information related to the interference, and
    wherein the uplink data is an interference signal to the another terminal.

12. The method of claim 11, wherein downlink control information (DCI) including the TA information related to the interference is transmitted.

13. The method of claim 11, further comprising transmitting indication information indicating whether to apply the TA information related to the interference.

14. The method of claim 11, wherein:
    the TA information related to the interference comprises static TA information transmitted through a radio resource control (RRC) message and dynamic TA information transmitted through DCI, and
    the TA information related to the interference is determined based on a switching time and a propagation delay.

15. The method of claim 11, further comprising transmitting downlink control information (DCI) including an additional guard period (GP) related to the interference or special subframe configuration information including the additional GP,
   wherein the additional GP is different from a default GP.
16. A base station comprising:
   a transceiver; and
   a processor configured to:
      determine timing advance (TA) information related to an interference, transmit, to a terminal via the transceiver, the TA information related to the interference, and
      receive, from the terminal via the transceiver, uplink data on a slot based on a timing adjustment according to the TA information related to the interference,
   wherein the TA information related to the interference is applied to the slot in case that the slot is switched from a downlink slot to an uplink slot so that a cyclic prefix (CP) associated with an uplink symbol of the terminal overlaps with a CP associated with a downlink symbol of another terminal based on a timing adjustment according to the TA information related to the interference, and
   wherein the uplink data is an interference signal to the another terminal.
17. The base station of claim 16, wherein downlink control information (DCI) including the TA information related to the interference is transmitted.
18. The base station of claim 16, wherein the processor is configured to transmit indication information indicating whether to apply the TA information related to the interference.
19. The base station of claim 16, wherein:
   the TA information related to the interference comprises static TA information transmitted through a radio resource control (RRC) message and dynamic TA information transmitted through DCI, and
   the TA information related to the interference is determined based on a switching time and a propagation delay.
20. The base station of claim 19, wherein the processor is configured to transmit downlink control information (DCI) including an additional guard period (GP) related to the interference, and
   wherein the additional GP is different from a default GP.

* * * * *